US010569640B2

(12) United States Patent
Baba et al.

(10) Patent No.: US 10,569,640 B2
(45) Date of Patent: Feb. 25, 2020

(54) VEHICLE CONTROL APPARATUS

(71) Applicant: TOYOTA JIDOSHA KABUSHIKI KAISHA, Toyota-shi, Aichi (JP)

(72) Inventors: Masayuki Baba, Toyota (JP); Nobufusa Kobayashi, Anjo (JP); Masato Yoshikawa, Toyota (JP); Kenta Kumazaki, Anjo (JP); Jun Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 16/038,229

(22) Filed: Jul. 18, 2018

(65) Prior Publication Data
US 2019/0039450 A1 Feb. 7, 2019

(30) Foreign Application Priority Data

Aug. 4, 2017 (JP) .................. 2017-152044

(51) Int. Cl.
*F16H 59/18* (2006.01)
*B60K 6/547* (2007.10)
(Continued)

(52) U.S. Cl.
CPC ............. *B60K 6/547* (2013.01); *B60K 6/445* (2013.01); *B60L 7/18* (2013.01); *B60L 7/26* (2013.01); *B60L 50/16* (2019.02); *B60L 50/61* (2019.02); *B60W 20/30* (2013.01); *B60L 7/20* (2013.01); *B60L 2240/12* (2013.01); *B60L 2240/16* (2013.01); *B60L 2240/486* (2013.01); *B60L 2240/507* (2013.01); *B60L 2240/80* (2013.01);
(Continued)

(58) Field of Classification Search
CPC ................ B60W 20/30; B60W 10/11; B60W 2520/105; B60W 10/115; B60W 2510/1025; F16H 2059/186
See application file for complete search history.

(56) References Cited

U.S. PATENT DOCUMENTS 5,863,275 A * 1/1999 Nozaki ................. B60W 10/06
477/107
5,984,034 A * 11/1999 Morisawa ................. B60K 6/48
180/65.28
(Continued)

FOREIGN PATENT DOCUMENTS

JP 2011-199959 A 10/2011

*Primary Examiner* — Sherry L Estremsky
(74) *Attorney, Agent, or Firm* — Oliff PLC

(57) ABSTRACT

A vehicle control apparatus includes a shift control portion is configured, when determining that a shift-down action to establish one of gear positions in a transmission mechanism by release of an engagement device and engagement of a one-way clutch, is to be executed during decelerating run of the vehicle, to initiate execution of the shift-down action to establish the one of the of gear positions after an input torque inputted to the transmission mechanism becomes not lower than a predetermined negative value. The predetermined negative value is a predetermined minimum value that becomes not lower than a certain value at a point of time at which the release of the engagement device is completed in process of the shift-down action. The certain value is a value of the input torque enabling the one-way clutch to be automatically engaged.

11 Claims, 8 Drawing Sheets

(51) Int. Cl.

| | | |
|---|---|---|
| | *B60K 6/445* | (2007.10) |
| | *B60W 20/30* | (2016.01) |
| | *B60L 50/16* | (2019.01) |
| | *B60L 7/26* | (2006.01) |
| | *B60L 50/61* | (2019.01) |
| | *B60L 7/18* | (2006.01) |
| | *B60L 7/20* | (2006.01) |
| | *B60W 10/11* | (2012.01) |
| | *B60W 10/18* | (2012.01) |
| | *B60W 30/18* | (2012.01) |

(52) U.S. Cl.
CPC ....... *B60L 2250/26* (2013.01); *B60L 2260/24* (2013.01); *B60L 2260/30* (2013.01); *B60W 10/11* (2013.01); *B60W 10/18* (2013.01); *B60W 30/18127* (2013.01)

(56) References Cited

U.S. PATENT DOCUMENTS

| | | | | |
|---|---|---|---|---|
| 6,019,699 | A * | 2/2000 | Hoshiya | ................. B60K 6/365 477/20 |
| 6,761,664 | B2 * | 7/2004 | Ayabe | ................... F16H 61/061 477/140 |
| 8,777,811 | B2 * | 7/2014 | Suzuki | ................... B60K 6/445 477/109 |

* cited by examiner

| AT GEAR POSITION | C1 | C2 | B1 | B2 | F1 |
|---|---|---|---|---|---|
| 1st | ◯ | | | △ | ◯ |
| 2nd | ◯ | | ◯ | | |
| 3rd | ◯ | ◯ | | | |
| 4th | | ◯ | ◯ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-152044 filed on Aug. 4, 2017, the disclosure of which is herein incorporated by reference in its entirety.

FIELD OF THE INVENTION

The present invention relates to a control apparatus for a vehicle including a drive power source and a mechanically-operated transmission mechanism that is configured to transmit a drive force of the drive power source.

BACKGROUND OF THE INVENTION

There is known a control apparatus for a vehicle that includes (i) a drive power source and (ii) a mechanically-operated transmission mechanism which constitutes a part of a power transmitting path between the drive power source and drive wheels of the vehicle and which is configured to establish each of a plurality of gear positions by engagement of at least one of a plurality of engagement devices including a one-way clutch. A vehicle control apparatus disclosed in JP-2011-199959A is an example of this type of control apparatus. This document discloses a technique relating to a regenerative torque generated in a vehicle having a motor/generator serving as drive power source, particularly, a technique of controlling the regenerative torque such that, when a shift-down action of a mechanically-operated transmission mechanism of the vehicle is executed in response to reduction of running speed of the vehicle during a coast regeneration (e.g., electric power regeneration performed by the motor/generator during decelerating run of the vehicle without an acceleration operation member and a brake operation member being operated), the regenerative torque is restrained from being increased until the shift-down action is completed, if the brake operation member is operated.

SUMMARY OF THE INVENTION

Among shift-down actions to be executed in the mechanically-operated transmission mechanism, there is a shift-down action to establish one of a plurality of gear positions by engagement of a one-way clutch. This shift-down action is executed by the engagement of the one-way clutch, which is automatically made after release of a releasing engagement device that is one of a plurality of engagement devices to be released in the shift-down action. When the shift-down action in which the one-way clutch is involved is executed during decelerating run of the vehicle, if the execution of the shift-down action is initiated in a state in which an input torque inputted to the mechanically-operated transmission mechanism is lower than zero by a certain degree or more (namely, the input torque is a negative value whose absolute value is somewhat large), for example, due to a regenerative torque that is somewhat large, the one-way clutch is not engaged immediately after the releasing engagement device has been released, thereby possibly causing a behavior reducing the shifting performance, for example, giving so-called "free-running feeling" to an operator of the vehicle in absence of a decelerating torque due to failure of the immediate engagement of the one-way clutch. Where the above-described one of the gear positions can be established also by engagement of another one of the engagement devices that is disposed in parallel with the one-way clutch, it might be possible to forcibly cause the another one of the engagement devices to be placed in its engaged state, so as not to leave the situation in which the one-way clutch is not engaged in process of the shift-down action. In this case, however, the another one of the engagement devices could be engaged with a large speed difference (for example, a large speed difference between input and output elements of the another one of the engagement devices, or a large speed difference between an actual value of an input rotating speed of the mechanically-operated transmission mechanism and a value of a synchronizing rotating speed after completion of the shifting action), thereby possibly causing a large shock or other behavior reducing the shifting performance.

The present invention was made in view of the background art described above. It is therefore an object of the present invention to provide a control apparatus for a vehicle, which is capable of restraining a behavior that reduces a shifting performance when it is determined that a down-shift action to establish a certain gear potion by engagement of a one-way clutch, is to be executed during decelerating run of the vehicle.

The object indicated above is achieved according to the following modes of the present invention.

According to a first mode of the invention, there is provided a control apparatus for a vehicle that includes (i) a drive power source and (ii) a mechanically-operated transmission mechanism which constitutes a part of a power transmitting path between the drive power source and drive wheels of the vehicle and which is configured to establish each of a plurality of gear positions by engagement of at least one of a plurality of engagement devices including a one-way clutch. The control apparatus includes a shift control portion configured to determine whether a shift-down action to establish one of the plurality of gear positions by release of one of the plurality of engagement devices and engagement of the one-way clutch that is made after the release of the one of the plurality of engagement devices, is to be executed during decelerating run of the vehicle. The shift control portion is configured, when determining that the shift-down action to establish the one of the plurality of gear positions is to be executed during the decelerating run of the vehicle, to initiate execution of the shift-down action to establish the one of the plurality of gear positions after an input torque inputted to the mechanically-operated transmission mechanism becomes not lower than a predetermined negative value. The predetermined negative value is a predetermined minimum value (lower limit value) that becomes not lower than a certain value at a point of time at which the release of the one of the plurality of engagement devices is completed in transition or process of the shift-down action, wherein the certain value is a value of the input torque enabling the one-way clutch to be automatically engaged. For example, the plurality of engagement devices include coupling devices each of which is other than the one-way clutch and each of which is to controlled by a control unit so as to be selectively placed in engaged, slipped or released state thereof, and the one of the plurality of engagement devices, which is to be placed in the released state when the above-described one of the plurality of gear positions is to be established, is one of the coupling devices.

According to a second mode of the invention, in the control apparatus according to the first mode of the invention, the one of the plurality of gear positions is established by the release of the one of the plurality of engagement devices and either one of the engagement of the one-way clutch and engagement of another one of the plurality of engagement devices, the another one being provided in parallel with the one-way clutch. The shift control portion is configured to initiate the execution of the shift-down action to establish the one of the plurality of gear positions by the release of the one of the plurality of engagement devices and the engagement of the another one of the plurality of engagement devices, when the shift-down action to establish the one of the plurality of gear positions is requested by an operation made by an operator of the vehicle.

According to a third mode of the invention, in the control apparatus according to the first or second mode of the invention, the shift control portion is configured to initiate the execution of the shift-down action to establish the one of the plurality of gear positions by the release of the one of the plurality of engagement devices and the engagement of the one-way clutch, when an acceleration operation is made by an operator of the vehicle so as to increase the input torque to a positive value.

According to a fourth mode of the invention, in the control apparatus according to any one of the first through third modes of the invention, the drive power source of the vehicle is configured to generate a creep torque causing the vehicle to be moved slowly, when a running speed of the vehicle is not higher than a predetermined low value without an acceleration operation. The shift control portion is configured to initiate the execution of the shift-down action to establish the one of the plurality of gear positions by the release of the one of the plurality of engagement devices and the engagement of the one-way clutch, when the running speed is reduced toward the predetermined low value such that the input torque inputted to the mechanically-operated transmission mechanism is increased to a positive value by the creep torque at a point of time at which the release of the one of the plurality of engagement devices is completed in process of the shift-down action.

According to a fifth mode of the invention, in the control apparatus according to any one of the first through fourth modes of the invention, the vehicle includes a motor/generator that serves as the drive power source. The control apparatus further includes a vehicle-state determining portion configured to make a determination as to whether the input torque inputted to the mechanically-operated transmission mechanism is not lower than the predetermined negative value, such that the determination is made based on a regenerative torque generated by the motor/generator.

According to a sixth mode of the invention, in the control apparatus according to any one of the first through fourth modes of the invention, the vehicle includes an engine that serves as the drive power source. The control apparatus further includes a vehicle-state determining portion configured to make a determination as to whether the input torque inputted to the mechanically-operated transmission mechanism is not lower than the predetermined negative value, such that the determination is made based on an engine braking torque generated by the engine.

According to a seventh mode of the invention, in the control apparatus according to any one of the first through fourth modes of the invention, the vehicle includes a motor/generator and an engine, both of which serve as the drive power source. The control apparatus further includes a vehicle-state determining portion configured to make a determination as to whether the input torque inputted to the mechanically-operated transmission mechanism is not lower than the predetermined negative value, such that the determination is made based on a regenerative torque generated by the motor/generator and/or an engine braking torque generated by the engine.

According to an eighth mode of the invention, in the control apparatus according to any one of the first through fourth modes of the invention, the vehicle includes: an engine that serves as the drive power source; an electrically-controlled transmission mechanism including a differential mechanism to which the engine is connected in a power transmittable manner, and a first motor generator connected to the differential mechanism, such that a differential state of the differential mechanism is controlled with an operating state of the first motor/generator being controlled; and a second motor/generator which serves as the drive power source and which is connected to an output rotary member of the electrically-controlled transmission mechanism in a power transmittable manner.

According to a ninth mode of the invention, the control apparatus according to the eighth mode of the invention further includes a vehicle-state determining portion configured to make a determination as to whether the input torque inputted to the mechanically-operated transmission mechanism is not lower than the predetermined negative value, such that the determination is made based on a regenerative torque generated by the second motor/generator.

According to a tenth mode of the invention, in the control apparatus according to any one of the fifth, seventh and ninth modes of the invention, the vehicle includes a braking device configured to apply a wheel braking torque to the drive wheels. The control apparatus further includes a braking-torque control portion that is configured, when it is determined that the input torque inputted to the mechanically-operated transmission mechanism is lower than the predetermined negative value, to switch at least a part of the regenerative torque to the wheel braking torque.

According to the first mode of the invention, the control apparatus includes a shift control portion configured to determine whether a shift-down action to establish one of the plurality of gear positions by release of one of the plurality of engagement devices and engagement of the one-way clutch that is made after the release of the one of the plurality of engagement devices, is to be executed during decelerating run of the vehicle. The shift control portion is configured, when determining that the shift-down action to establish the one of the plurality of gear positions is to be executed during the decelerating run of the vehicle, to initiate execution of the shift-down action to establish the one of the plurality of gear positions after an input torque inputted to the mechanically-operated transmission mechanism becomes not lower than a predetermined negative value. The predetermined negative value is a predetermined minimum value that becomes not lower than a certain value at a point of time at which the release of the one of the plurality of engagement devices is completed in process of the shift-down action, wherein the certain value is a value of the input torque enabling the one-way clutch to be automatically engaged. This arrangement makes it possible to cause the one-way clutch to be engaged easily after the releasing engagement device (i.e., the above-described one of the plurality of engagement devices) has been released, so that the vehicle operator is less likely to uncomfortably recognize a free-running feeling due to failure of the immediate engagement of the one-way clutch after the release of the releasing engagement device. Therefore, when it is determined that the shift-down action to establish the one of the gear positions by the engagement of the one-way clutch, is to be executed during decelerating run of the vehicle, it is possible to restrain a behavior undesirably reducing the shifting performance.

According to the second mode of the invention, the shift control portion is configured to initiate the execution of the shift-down action to establish the one of the plurality of gear positions by the release of the releasing engagement device (i.e., the above-described one of the plurality of engagement devices) and the engagement of the another one of the plurality of engagement devices that is provided in parallel with the one-way clutch, when the shift-down action to establish the one of the plurality of gear positions is requested by an operation made by an operator of the vehicle. Therefore, the shift-down action requested by the vehicle operator is executed in satisfactory response to the operation made by the operator, without delaying the execution of the shift-down action until the input torque inputted to the mechanically-operated transmission mechanism becomes not lower than the predetermined negative value. Further, when the execution of the shift-down action by the engagement of the another one of the engagement devices is initiated, the releasing engagement device is not yet released because of delay of the execution of the shift-down action by the engagement of the one-way clutch, it is possible to restrain shock generated by the engagement of the another one of the engagement devices.

According to the third mode of the invention, the shift control portion is configured to initiate the execution of the shift-down action to establish the one of the plurality of gear positions by the automatic engagement of the one-way clutch, when an acceleration operation is made by an operator of the vehicle so as to increase the input torque to a positive value. Therefore, it is not necessary to delay the execution of the shift-down action until the input torque inputted to the mechanically-operated transmission mechanism becomes not lower than the predetermined negative value.

According to the fourth mode of the invention, the shift control portion is configured to initiate the execution of the shift-down action to establish the one of the plurality of gear positions by the automatic engagement of the one-way clutch, when the running speed is reduced toward the predetermined low value such that the input torque inputted to the mechanically-operated transmission mechanism is increased to a positive value by the creep torque at a point of time at which the release of the one of the plurality of engagement devices is completed in process of the shift-down action. Therefore, it is not necessary to delay the execution of the shift-down action until the input torque inputted to the mechanically-operated transmission mechanism becomes not lower than the predetermined negative value.

According to the fifth mode of the invention, the vehicle-state determining portion makes a determination as to whether the input torque inputted to the mechanically-operated transmission mechanism is not lower than the predetermined negative value, such that the determination is made based on a regenerative torque generated by the motor/generator. Therefore, it is appropriately determined whether the input torque is not lower than the predetermined negative value.

According to the sixth mode of the invention, the vehicle-state determining portion makes a determination as to whether the input torque inputted to the mechanically-operated transmission mechanism is not lower than the predetermined negative value, such that the determination is made based on an engine braking torque generated by the engine. Therefore, it is appropriately determined whether the input torque is not lower than the predetermined negative value.

According to the seventh mode of the invention, the vehicle-state determining portion makes a determination as to whether the input torque inputted to the mechanically-operated transmission mechanism is not lower than the predetermined negative value, such that the determination is made based on a regenerative torque generated by the motor/generator and/or an engine braking torque generated by the engine. Therefore, it is appropriately determined whether the input torque is not lower than the predetermined negative value.

According to the eighth mode of the invention, in the control apparatus for the vehicle includes the electrically-controlled transmission mechanism and the mechanically-operated transmission mechanism that are connected in series with each other, it is possible to restrain a behavior undesirably reducing the shifting performance when it is determined that the shift-down action to establish the one of the gear positions by the engagement of the one-way clutch, is to be executed, it is possible to restrain a behavior undesirably reducing the shifting performance.

According to the ninth mode of the invention, the vehicle-state determining portion makes a determination as to whether the input torque inputted to the mechanically-operated transmission mechanism is not lower than the predetermined negative value, such that the determination is made based on a regenerative torque generated by the second motor/generator. Therefore, it is appropriately determined whether the input torque is not lower than the predetermined negative value.

According to the tenth mode of the invention, the braking-torque control portion is configured, when it is determined that the input torque inputted to the mechanically-operated transmission mechanism is lower than the predetermined negative value, to switch at least a part of the regenerative torque to the wheel braking torque. Therefore, it is possible to reduce a length of time for which the execution of the shift-down action is delayed until the input torque inputted to the mechanically-operated transmission mechanism becomes not lower than the predetermined negative value.

DETAILED DESCRIPTION OF PREFERRED EMBODIMENTS

Hereinafter, some embodiments of the invention will be described in detail with reference to the accompanying drawings.

First Embodiment

Figure 1:
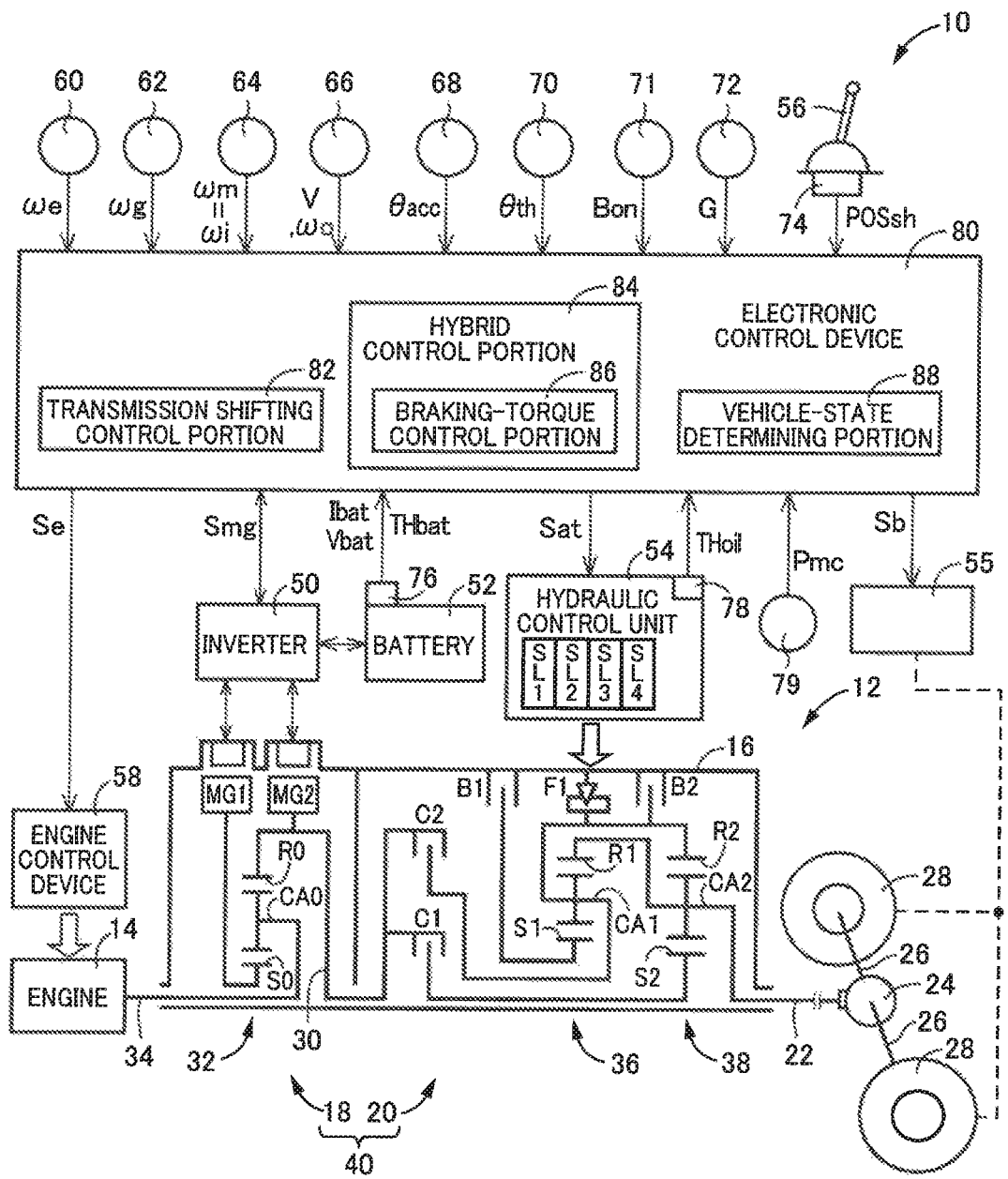
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 serving as a drive power source, an electrically-controlled continuously-variable transmission portion 18 (hereinafter referred to as "continuously-variable transmission portion 18") connected directly or indirectly via a damper (not shown) or any other device to the engine 14, and a mechanically-operated step-variable transmission portion 20 (hereinafter referred to as "step-variable transmission portion 20) connected to an output rotary member of the continuously-variable transmission portion 18. The continuously-variable transmission portion 18 and the step-variable transmission portion 20 are disposed in series with each other within a transmission casing 16 (hereinafter referred to as "casing 16") serving as a non-rotatable member fixed to a body of the vehicle 10, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously-variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously-variable transmission portion 18, without a fluid-operated type power transmitting device such as a torque converter or a fluid coupling being disposed between the engine 14 and the transmission portion 18.

The continuously-variable transmission portion 18 is provided with: a first motor/generator (first rotating machine) MG1; a differential mechanism 32 serving as a power distributing device to mechanically distribute the drive force of the engine 14 to the first motor/generator MG1, and to an intermediate power-transmitting member 30 that is an output rotary member of the continuously-variable transmission portion 18; and a second motor/generator (second rotating machine) MG2 connected to the intermediate power-transmitting member 30 in a power transmittable manner. The continuously-variable transmission portion 18 is an electrically-controlled continuously-variable transmission wherein a differential state of the differential mechanism 32 is controllable by controlling an operating state of the first motor/generator MG1. The first motor/generator MG1 functions as a differential motor/generator (differential electric motor) while the second motor/generator MG2 is an electric motor that serves as a drive power source, namely, a vehicle driving motor/generator (vehicle driving electric motor). The vehicle 10 is a hybrid vehicle provided with the drive power source in the form of the engine 14 and the second motor/generator MG2.

Each of the first motor/generator MG1 and the second motor/generator MG2 is an electrically-operated rotary device having a function of an electric motor and a function of an electric generator. The first motor/generator MG1 and the second motor/generator MG2 are connected to an electric-power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is connected to the engine 14 through a connecting shaft 34 in a power transmittable manner, and the sun gear S0 is connected to the first motor/generator MG1 in a power transmittable manner, while the ring gear R0 is connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a mechanically-operated transmission mechanism which constitutes a part of a power transmitting path between the intermediate power-transmitting member 30 and the drive wheels 28. The intermediate power-transmitting member 30 also serves as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power-transmitting member 30 such that the intermediate power-transmitting member 30 is rotated together with the second motor/generator MG2, or since the engine 14 is connected to an input rotary member of the continuously-variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of engagement devices E including a one-way clutch (e.g., sprag clutch) F1, a clutch C1, a clutch C2, a brake B1 and a brake B2. Hereinafter, the clutch C1, clutch C2, brake B1 and brake B2 will be referred to as "coupling devices CB" unless otherwise specified.

Each of the coupling devices CB is a hydraulically operated frictional coupling device in the form of a multiple-disc type or a single-disc type clutch or brake that is to be pressed by a hydraulic actuator, or a band brake that is to be tightened by a hydraulic actuator. The coupling devices CB are selectively placed in engaged, slipped or released states with their torque capacities (engaging torque values or transmitted torque values) Tcb being changed according to engaging hydraulic pressures PRcb applied thereto, which are regulated by respective solenoid-operated valves SL1-SL4 incorporated within a hydraulic control unit 54 provided in the vehicle 10. In order for each coupling device CB to be able to transmit a torque (for example, an AT input torque Ti which is an input torque of the step-variable transmission portion 20) between the intermediate power-transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (transmitted torque) to be transmitted through an engaging action of the coupling device CB. However, it is noted that an increase of the engaging torque Tcb enough to obtain the transmitted torque does not cause an increase of the transmitted torque. That is, the engaging torque Tcb is equivalent to a maximum value of the torque that can be transmitted through the coupling device CB, and the transmitted torque is equivalent to the torque that is actually transmitted through the coupling device CB. It is noted that the engaging torque (transmitted torque) Tcb and the engaging hydraulic pressure PRcb are substantially proportional to each other, except at a stage the engaging hydraulic pressure PRcb is raised to initiate an engaging contact of the input and output elements with each other.

Basically, the one-way clutch F1 is placed automatically in its engaged state when the drive power source is in its driving state in which the AT input torque Ti is a positive value, and is placed automatically in its released state when the drive power source is in its driven state in which the AT input torque Ti is a negative value.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power-transmitting member 30, casing 16 or output shaft 22, either directly or indirectly (selectively) through the coupling devices CB or the one-way clutch F1.

The step-variable transmission portion 20 is shifted to a selected one of four AT gear positions (speed positions) by engaging actions of selected ones of the engaging devices E. These four AT gear positions have respective different gear ratios (speed ratios) γat (=AT input speed ωi/AT output speed ωo). Namely, the step-variable transmission portion 20 is shifted up and down from one gear position to another by placing selected ones of the coupling devices E in the engaged state. The AT input speed ωi is a rotating speed (angular velocity) of the input rotary member of the step-variable transmission portion 20, that is, a rotating speed of the intermediate power-transmitting member 30, which is equal to an MG2 rotating speed ωm that is an rotating speed of the second motor/generator MG2. Thus, the AT input speed ωi can be represented by the MG2 rotating speed ωm. The AT output speed ωo is a rotating speed of the output shaft 22 of the step-variable transmission portion 20, which is considered to be an output speed of a transmission device 40 which consists of the continuously-variable transmission portion 18 and the step-variable transmission portion 20.

Figures 2, 3:
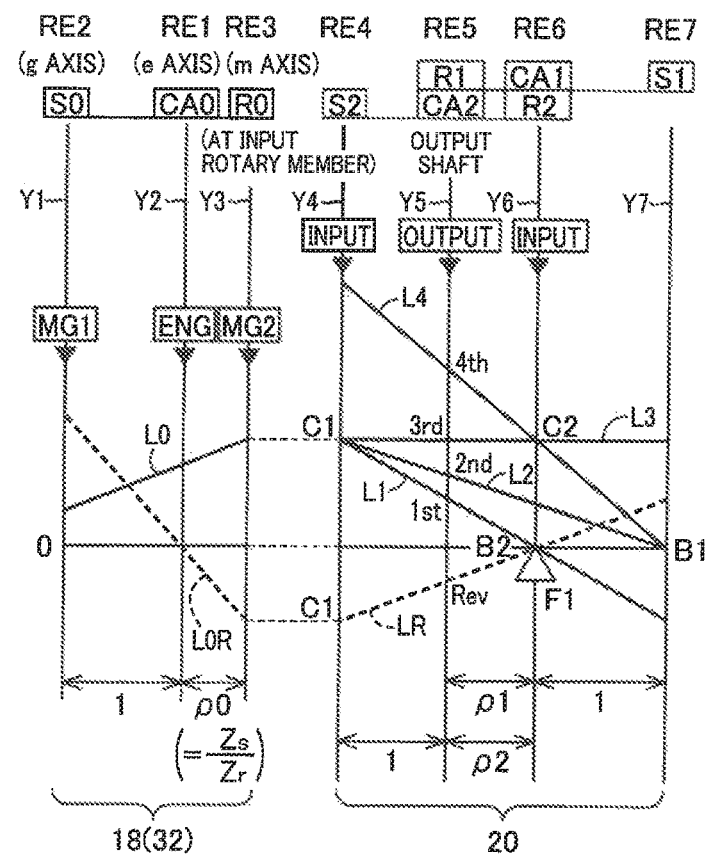
FIG. 2 is a table indicating a relationship between gear positions of a mechanically-operated step-variable transmission portion shown in FIG. 1 and combinations of engagement devices placed in engaged states to establish the respective gear positions.
FIG. 3 is a collinear chart indicating a relationship among rotating speeds of rotary elements of an electrically-controlled continuously-variable transmission portion and the mechanically-operated step-variable transmission portion.

Reference is now made to FIG. 2, which is the table indicating the relationship between the first through fourth speed AT gear positions of the step-variable transmission portion 20 shown in FIG. 1 and combinations of the engaging devices E placed in the engaged states to establish the respective AT gear positions. In the table, the four forward AT gear positions are respectively represented by "1st", "2nd", "3rd" and "4th". The first speed AT gear position "1st" is the lowest-speed gear position having a highest gear ratio γat, while the fourth speed AT gear position "4th" is the highest-speed gear position having a lowest gear ratio γat. The gear ratio γat decreases in the direction from the first speed AT gear position (lowest-speed gear position) "1st" toward the fourth speed AT gear position (highest-speed gear position) "4th". In the table, "O" indicates the engaged state of the engagement devices E, "Δ" indicates the engaged state of the brake B2 during application of an engine brake to the vehicle 10 or during a shift-down action of the step-variable transmission portion 20 while the vehicle 10 is in coasting run, and the blank indicates the released state of the engagement devices E. The first speed AT gear position "1st" is established by engagement of the one-way clutch F1, and is established also by engagement of the brake B2 in place of the engagement of the one-way clutch F1. The brake B2 is disposed in parallel with the one-way clutch F1. For example, when the vehicle 10 is started or accelerated, the brake B2 is not required to be placed in the engaged state, and the first speed AT gear position "1st" is established by engagement of the clutch C1 and automatic engagement of the one-way clutch F1.

The shift-down action of the step-variable transmission portion 20 in coasting run of the vehicle 10 is a kind of a "power-off shift-down action" that is required as a result of reduction of a vehicle-speed-related value (vehicle running speed V, for example) due to reduction of a required drive force (as represented by an operation degree θacc of an accelerator pedal) or during decelerating run of the vehicle 10 in a released position of the accelerator pedal (with the operation degree θacc of the accelerator pedal being zero or substantially zero), and is a shift-down action that is required during decelerating run of the vehicle 10 in the released position of the accelerator pedal. It is noted that the step-variable transmission portion 20 is placed in a neutral position, i.e., in a power transmission cutoff state when all of the engagement devices E are placed in the released states.

The step-variable transmission portion 20 is shifted up or down to establish a newly selected one of the four AT gear positions, according to the operation degree θacc of the accelerator pedal and the vehicle running speed V, with a releasing action of one of the engagement devices E (that include the coupling devices CB) and an engaging action of another one of the engagement devices E, which are controlled by the electronic control device 80, more specifically, by a transmission shifting control portion 82 configured to control shifting actions of the step-variable transmission portion 20. The above-indicated one engagement device E (i.e., releasing engagement device) was placed in the engaged state before the step-variable transmission portion 20 is shifted to establish the newly selected AT gear position, while the above-indicated another engagement device E (i.e., engaging engagement device) is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, releasing and engaging actions of the selected two engagement devices E. For instance, the step-variable transmission portion 20 is shifted down from the second speed AT gear position "2nd" to the first speed AT gear position "1st", with the release of the brake B1 and the engagement of the brake B2, as indicated in the table of FIG. 2. In this instance, the hydraulic pressures applied to the brakes B1 and B2 are transiently controlled to bring these brakes B1 and B2 into the released and engaged states, respectively. The releasing engagement device is one of the engagement devices E which is involved in a shifting action of the step-variable transmission portion 20 and which is to be released in process of the shifting action of the step-variable transmission portion 20. The engaging engagement device is one of the engagement devices E which is involved in a shifting action of the step-variable transmission portion 20 and which is to be engaged in process of the shifting action of the step-variable transmission portion 20. It is noted that the step-variable transmission portion 20 is shifted down from the second speed AT gear position "2nd" to the first speed AT gear position "1st", also with the release of the brake B1 as the releasing engagement device and the engagement of the one-way clutch F1 that is automatically made after the release of the brake B1, as indicated in the table of FIG. 2.

The collinear chart of FIG. 3 indicates a relationship among rotating speeds of the rotary elements of the continuously-variable transmission portion 18 and the step-variable transmission portion 20. In this collinear chart, three vertical lines Y1, Y2 and Y3 corresponding to the respective three rotary elements of the differential mechanism 32 of the continuously-variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio p0 of the differential mechanism 32, while the distances between the adjacent ones of the vertical lines Y4-Y7 are determined by gear ratios ρ 1 and p2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously-variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power-transmitting member 30. Thus, a rotary motion of the engine 14 is transmitted to the step-variable transmission portion 20 through the intermediate power-transmitting member 30. In a part of the collinear chart corresponding to the continuously-variable transmission portion 18, each of straight lines L0 and L0R intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power-transmitting member 30 through the clutch C1, the fifth rotary element RE5 is connected to the output shaft 22, the sixth rotary element RE6 is selectively connected to the intermediate power-transmitting member 30 through the clutch C2 and is selectively connected to the casing 16 through the brake B2 or the one-way clutch F1, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "1st", "2nd", "3rd"

and "4th" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque that is a negative torque generated by the first motor/generator MG1 operated in the positive direction is applied to the sun gear S0, a directly transmitted engine torque Td $(=Te/(1+\rho)=-(1/\rho)*Tg)$ that is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 serves as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely rotatable in the negative direction. Namely, in the motor drive mode, the engine 14 is held in non-operated state, so that an rotating speed ωe of the engine 14 (engine rotating speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear position.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission portion 20 placed in the first speed AT gear position. To drive the vehicle 10 in the rearward direction, the electronic control device 80 (particularly, a hybrid control portion 84 configured to control running of the vehicle 10) described below is configured to command the second motor/generator MG2 to be rotated in a direction opposite to a direction during the forward running, so as to generate the reverse driving MG2 torque Tm (negative reverse driving torque) opposite to the forward driving MG2 torque Tm (positive forward driving torque), while the step-variable transmission portion 20 is placed in a low-speed AT gear position (first speed AT gear position, for example). Thus, the vehicle 10 is driven in the rearward direction with the negative MG2 torque Tm while the step-variable transmission portion 20 is placed in one of the forward driving AT gear positions. In the hybrid drive mode, too, the second motor/generator MG2 can be rotated in the negative direction as indicated by the straight line L0R, so that the vehicle 10 can be driven in the rearward direction in the hybrid drive mode, as well as in the motor drive mode.

In the vehicular drive system 12, the continuously-variable transmission portion 18 serves as an electrically-controlled shifting mechanism (electrically-controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power-transmitting member 30 is connected (in other words, to which the second motor/generator MG2 is operatively connected). Namely, the continuously-variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously-variable transmission portion 18 is operated as an electrically-controlled continuously-variable transmission a gear ratio γ0 (=ωe/ωm) of which is variable. The gear ratio is a ratio of rotating speed of the connecting shaft 34 (namely, engine rotating speed ωe) to the rotating speed of the intermediate power-transmitting member 30 (namely, MG2 rotating speed ωm).

In the hybrid drive mode, for instance, the rotating speed of the sun gear S0 is increased or reduced by controlling the rotating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine rotating speed ωe) is accordingly increased or reduced. In running with operation of the engine 14, therefore, the engine 14 can be operated at an efficient operating point. That is, the step-variable transmission portion 20 to be placed in a selected one of the AT gear positions and the continuously-variable transmission portion 18 serving as a continuously-variable transmission cooperate to provide the transmission device 40 in which the continuously-variable transmission portion 18 (differential mechanism 32) and the step-variable transmission portion 20 are disposed in series with each other and which serves as a continuously-variable transmission as a whole.

Alternatively, the continuously-variable transmission portion 18 can be shifted like a step-variable transmission. Accordingly, the transmission device 40 constituted by the step-variable transmission portion 20 to be placed in one of the AT gear positions and the continuously-variable transmission portion 18 which can be shifted like the step-variable transmission can be shifted like a step-variable transmission as a whole. That is, the step-variable transmission portion 20 and the continuously-variable transmission portion 18 can be controlled to selectively establish a plurality of speed positions (hereinafter referred to as "overall speed positions" although it may be referred also to as "conceptual speed positions") having respective different values of a gear ratio $\gamma t$ ($=\omega e/\omega$) which is a ratio of the engine rotating speed $\omega e$ to the output speed $\omega o$. The gear ratio $\gamma t$ is an overall gear ratio of the transmission device 40 consisting of the continuously-variable transmission portion 18 and the step-variable transmission portion 20 which are disposed in series with each other. The overall gear ratio $\gamma t$ is equal to a product of the gear ratio $\gamma 0$ of the continuously-variable transmission portion 18 and the gear ratio $\gamma at$ of the step-variable transmission portion 20, namely, $\gamma t = \gamma 0 * \gamma at$.

Figures 4, 5:
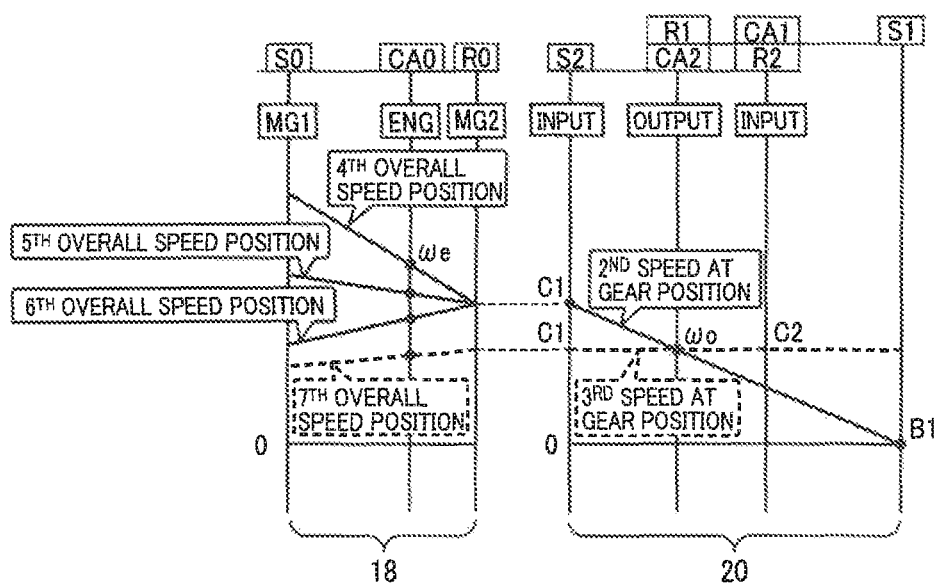
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different gear ratio values $\gamma 0$ of the continuously-variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously-variable transmission portion 18 is controlled to control the engine rotating speed $\omega e$ with respect to the output speed $\omega o$ for establishing the predetermined overall gear ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously-variable transmission portion 18 is controlled according to the selected one of the AT gear positions, for shifting the transmission device 40 from one of the overall speed positions to another.

Referring back to FIG. 1, the vehicle 10 is provide with a wheel braking device 55 serving as a braking device for applying a braking torque to the vehicle wheels (drive wheels 28, and driven wheels not shown). The wheel braking device 55 is arranged to apply a hydraulic braking pressure (supply a pressurized braking fluid) to a wheel brake cylinder provided for each of the wheels, according to an operation of a brake operation member (brake pedal, for example) by the vehicle operator. Normally, the braking fluid is pressurized by a master cylinder of the wheel braking device 55 to generate master cylinder pressure Pmc corresponding to an operating force acting on the brake pedal, so that the master cylinder pressure Pmc is supplied as the hydraulic braking pressure directly to the wheel brake cylinders. On the other hand, the wheel braking device 50 is controlled to apply, to the wheel brake cylinders, the hydraulic braking pressure not corresponding to the operating force of the brake pedal, such that the hydraulic braking pressure is suitably regulated to implement various braking controls such as: a cooperative braking control in a decelerating run of the vehicle 10, in which a total braking force required to be applied to the vehicle 10 is controlled to be equal to a sum of the hydraulic braking force generated by the wheel brake cylinders and a regenerative braking force; an ABS control (anti-lock braking control) in which the hydraulic braking pressure is controlled so as to prevent locking of the wheels on a roadway surface having a relatively low friction coefficient $\mu$; a traction control in which the hydraulic braking pressure is controlled to adjust a traction force for starting the vehicle 10; a VSC control (vehicle stability control) for improved stability of turning or cornering of the vehicle 10; and a hill-hold braking control for stable stopping of the vehicle 10 on an uphill or downhill roadway.

The vehicle 10 is provided with the control apparatus in the form of the electronic control device 80 configured to control various devices of the vehicle 10 such as the engine 14, continuously-variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals from various sensors provided on the vehicle 10, such as: an output signal of an engine speed sensor 60 indicative of the engine speed $\omega e$; an output signal of an MG1 speed sensor 62 indicative of the MG1 speed $\omega g$ which is the rotating speed of the first motor/generator MG1; an output signal of an MG2 speed sensor 64 indicative of the MG2 speed $\omega m$ that is the AT input speed $\omega i$; an output signal of an output speed sensor 66 indicative of the output speed $\omega o$ corresponding to the vehicle running speed V; an output signal of an accelerator-pedal operation degree sensor 68 indicative of the operation degree $\theta acc$ of a vehicle-acceleration operation member in the form of the accelerator pedal, which operation degree $\theta acc$ represents a degree of acceleration of the vehicle 10 required by the vehicle operator; an output signal of a throttle valve opening angle sensor 70 indicative of an angle $\theta th$ of opening of an electronic throttle valve; a brake-on Bon as an output signal of a brake switch 71 indicative of an operation of the brake pedal by the vehicle operator to actuate the wheel braking device 55; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided on the vehicle 10; an output signal of a battery sensor 76 indicative of a temperature THbat, a charging/discharging electric current Ibat and a voltage Vbat of the battery 52; an output signal of an oil temperature sensor 78 indicative of a temperature THoil of a working fluid used for operating hydraulic actuators of the coupling devices CB;

and an output signal of a master cylinder pressure sensor 79 indicative of the master cylinder pressure Pmc generated by the master cylinder of the wheel braking device 55. Further, the electronic control device 80 generates various output signals to the various devices provided in the vehicle 10, such as: an engine control command signal Se to be applied to an engine control device 58 provided to control a throttle actuator, an fuel injecting device and an ignition device, for controlling the engine 14; motor/generator control command signals Smg to be applied to the inverter 50, for controlling the first motor/generator MG1 and the second motor/generator MG2; hydraulic control command signals Sat to be applied to the hydraulic control unit 54, for controlling the operating states of the coupling devices CB (namely, for controlling the shifting actions of the step-variable transmission portion 20); and a braking control command signal Sb to be applied to the wheel braking device 55 for controlling the wheel braking torques of the wheel braking cylinders. The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current or a drive voltage corresponding to the hydraulic pressure command value, so that the outputted drive current or voltage is supplied to the hydraulic control unit 54.

The shift lever 56 is operable to be placed in a selected one of a plurality of operation positions POSsh that consist of, for example, a parking position P, a reverse position R, a neutral position N, a drive position D and a manual position M. With the shift lever 56 being placed in the parking position P, the transmission device 40 is placed in its parking position in which the transmission device 40 is placed in its neutral state (for example, in its neutral state in which all of the engagement devices E including the coupling devices CB being released whereby the power transmission is disabled in the step-variable transmission portion 20), with rotation of the output shaft 22 being mechanically inhibited (locked). With the shift lever 56 being placed in the reverse position R, the transmission device 40 is placed in its reverse drive position for enabling the vehicle 10 to run in a reverse direction, with the first speed AT gear position 1st being established in the step-variable transmission portion 20. With the shift lever 56 being placed in the neutral position N, the transmission device 40 is placed in its neutral position in which the transmission device 40 is placed in its neutral state. With the shift lever 56 being placed in the drive position D, the transmission device 40 is placed in its forward drive position whereby an automatic shifting control using all of the overall speed positions consisting of the first through tenth overall speed positions is performed for enabling the vehicle 10 to run in a forward direction. That is, with the shift lever 56 being in placed in the drive position D as one of the operation positions POSsh, an automatic shifting mode is established whereby the transmission device 40 is automatically placed in a selected one of the overall speed positions, which is selected in accordance with a shifting map (e.g., overall speed-position shifting map described below). With the shift lever 56 being placed in the manual position M, the transmission device 40 is placed in its manual shift position whereby one of the overall speed positions can be switched to another by shifting operation made by the vehicle operator. The operator's shifting operation is made by (i) a manual operation made by placing the shift lever 56 into one of a shift-up position and a shift-down position that are provided on respective opposite sides of the manual position M and/or (ii) a manual operation made to a paddle switch which is provided in a steering wheel and which has a shift-up switch and a shift-down switch, for example. That is, with the shift lever 56 being in placed in the manual position M as one of the operation positions POSsh, a manual shifting mode is established whereby the transmission device 40 is placed in a selected one of the overall speed positions, which is selected in accordance with the operator's shifting operation. It is noted that, where the paddle switch is provided in the vehicle 10, even when the shift lever 56 being placed in the drive position D, if the paddle switch is operated by the operator, the manual shifting mode is established whereby one of the overall speed positions of the transmission device 40 can be switched to another (namely, the transmission device 40 can be shifted) by the manual operation. Thus, the shift lever 56 serves a switching operation member that is to be manually operated to receive a command that requests switching from one of the overall speed positions of the transmission device 40 to another.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be charged to the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls in the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator-pedal operation degree θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator-pedal operation degree θacc are taken along respective two axes. The shifting lines in the AT gear position shifting map consist of shift-up lines (indicated by solid lines in FIG. 6) for determining a shift-up action of the step-variable transmission portion 20, and shift-down lines (indicated by broken lines in FIG. 6) for determining a shift-down action of the step-variable transmission portion 20. Each of the shifting lines is defined by a series of shifting points which are determined such that the step-variable transmission portion 20 should be shifted up or down when the output speed ωo becomes higher or lower than the shifting point at a given value of the accelerator-pedal operation degree θacc or the regenerative torque, or when the accelerator-pedal operation degree θacc or the regenerative torque becomes larger or smaller than the shifting point at a given value of the output speed ωo.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator-pedal operation degree θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem. For example, the engine control command signal Se represents a command value of an engine power Pe which is a power of the engine 14 outputting the torque Te at its present rotating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 rotating speed ωm.

When the transmission device 40 as a whole is operated as the continuously-variable transmission with the continuously-variable transmission portion 18 being operated as the continuously-variable transmission, for instance, the hybrid control portion 84 controls the engine 14 and the electric power amount Wg to be generated by the first motor/generator MG1, so as to establish the engine rotating speed ωe and the engine torque Te for obtaining the engine power Pe to establish the required vehicle drive power Pdem, while taking account of a highest fuel economy point of the engine 14, so that the gear ratio γ0 of the continuously-variable transmission portion 18 is controlled so as to be continuously varied. As a result, the gear ratio γt of the transmission device 40 is controlled while the continuously-variable transmission portion 18 is operated as the continuously-variable transmission.

When the transmission device 40 as a whole is operated as the step-variable transmission with the continuously-variable transmission portion 18 being operated as the step-variable transmission, for instance, the hybrid control portion 84 determines a shifting action of the transmission device 40 according to an overall speed-position shifting map, for example, and performs a shifting control of the continuously-variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine rotating speed ωe according to the output speed ωo so as to maintain the respective gear ratio values γt. It is noted that the gear ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements. It is further noted that, during the manual shifting mode, the hybrid control portion 84 performs a shifting control of the continuously-variable transmission portion 18 to establish a selected one of the plurality of overall speed positions that is selected in accordance with the operator's shifting operation, in cooperation with the transmission shifting control portion 82 to shift the step-variable transmission portion 20 selectively to the AT gear positions.

Figure 6:
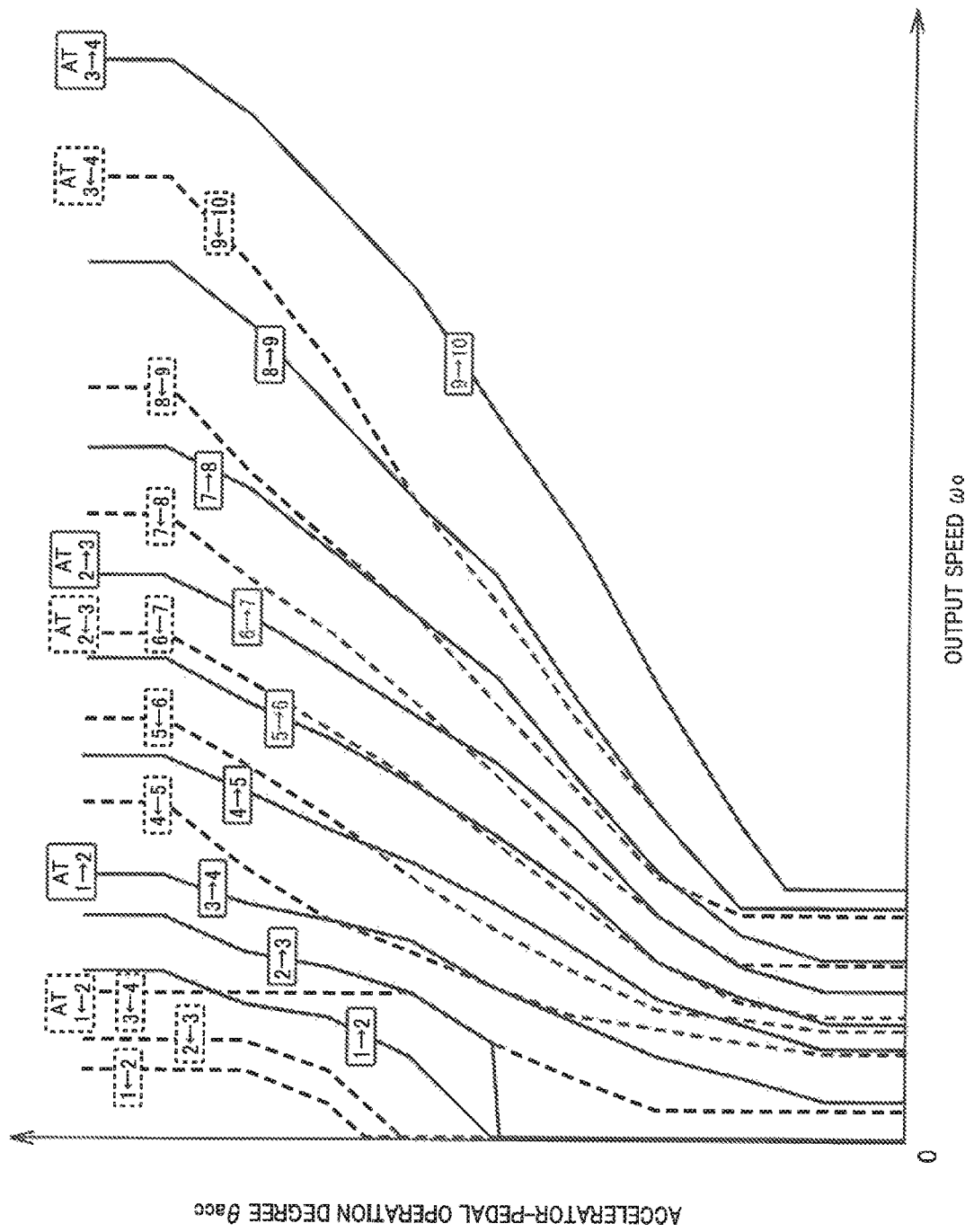
FIG. 6 is a view illustrating an example of an overall speed-position shifting map used to shift up and down the transmission device from each of the overall speed positions to the adjacent position or positions.

Like the AT gear position shifting map, the above-indicated overall speed-position shifting map is a relationship between the output speed ωo and the accelerator-pedal operation degree θacc as parameters. FIG. 6 is the view illustrating an example of the overall speed-position shifting map. In FIG. 6, solid lines indicate shift-up boundary lines while broken lines indicate shift-down boundary lines. The transmission device 40 consisting of the continuously-variable transmission portion 18 and the step-variable transmission portion 20 which are disposed in series with each other is shifted from one of the overall speed positions to another according to the overall speed-position shifting map, as if the transmission device 40 was shifted like a step-variable transmission as a whole. This overall step-variable shifting control to control the shifting actions of the transmission device 40 as the step-variable transmission as a whole may be implemented preferentially to the continuously-variable shifting control of the transmission device 40 as the continuously-variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the third overall speed position and the fourth overall speed position, for example, the step-variable transmission portion 20 is shifted between the first speed AT gear position and the second speed AT gear position. When the transmission device 40 is shifted between the sixth overall speed position and the seventh overall speed position, the step-variable transmission portion 20 is shifted between the second speed AT gear position and the third speed AT gear position. When the transmission device 40 is shifted between the ninth overall speed position and the tenth overall speed position, the step-variable transmission portion 20 is shifted between the third speed AT gear position and the fourth speed AT gear position. (See FIG. 4.) Therefore, the AT gear position shifting map is formulated such that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed-position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine rotating speed ωe, so that the vehicle operator is less likely to uncomfortably recognize a shifting shock of the step-variable transmission portion 20.

The hybrid control portion 84 selectively establishes the motor drive mode or the hybrid drive mode, depending upon running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

When neither the acceleration operation member nor the brake operation member is operated, for example, during a temporary stop of the vehicle 10, the hybrid control portion 84 causes the second motor/generator MG2 to generate a creep torque causing a creep phenomenon in which the vehicle 10 is moved slowly. Thus, when the running speed V is not higher than a predetermined low value without the acceleration operation member being operated, the creep torque is generated by the second motor/generator MG2. It is noted that the creep torque may be generated by the engine 14 in place of or addition to the second motor/generator MG2, when the engine 14 is in an idling state.

The hybrid control portion 84 includes a braking-torque control means or portion in the form of a braking-torque control portion 86 configured, during decelerating run of the vehicle 10, determine a target deceleration Gtgt of the vehicle 10 as a required overall braking torque, and controls the overall braking torque of the vehicle 10 so as to obtain the target vehicle deceleration Gtgt. The braking-torque control portion 86 calculates the target vehicle deceleration Gtgt on the basis of the master cylinder pressure Pmc, and according to a predetermined relationship between the target vehicle deceleration Gtgt and the master cylinder pressure Pmc, which relationship is formulated such that the target vehicle deceleration Gtgt increases with increase of the master cylinder pressure Pmc corresponding to an amount of braking operation made by the vehicle operator. It is noted that, when the braking operation is not made by the operator, the target deceleration Gtgt is calculated to correspond to zero as the master-cylinder hydraulic pressure Pmc.

For example, the overall braking torque of the vehicle 10 is a sum of the regenerative torque, an engine braking torque and the wheel braking torque that is generated by the wheel braking device 55. For maximizing energy efficiency, generation of the regenerative torque by the second motor/generator MG2 is given the highest priority in the control of the overall braking torque. Where the required overall braking torque of the vehicle 10 is comparatively small, for example, the regenerative torque is initially primarily generated by the second motor/generator MG2, and the wheel braking torque is generated by the wheel braking device 55, in place of the regenerative torque, immediately before the vehicle 10 is brought into a complete stop (into a stationary state). Where the required overall braking torque of the vehicle 10 is comparatively large, the wheel braking torque is added to the regenerative torque, namely, the regenerative torque is increased with decrease of the running speed V of the vehicle 10, and the wheel braking torque is generated in place of the regenerative torque, immediately before the vehicle 10 is brought into the complete stop. The braking-torque control portion 86 calculates a required value of the regenerative torque to obtain the target vehicle deceleration Gtgt, according to a predetermined relationship. This required value of the regenerative torque is increased with increase of the braking operation amount. The braking-torque control portion 86 controls the regenerative operation of the second motor/generator MG2 so as to obtain the calculated required value of the regenerative torque. The regenerative operation control performed by the braking-torque control portion 86 is a control for causing the second motor/generator MG2 to be driven by torque inputted from the drive wheels 28 so as activate the second motor/generator MG2 as a generator, and for charging the battery 52 with power generated by the motor/generator MG2, through the inverter 50.

When the target vehicle deceleration Gtgt is established by the regenerative operation of the second motor/generator MG2 in the decelerating run of the vehicle 10, the braking-torque control portion 86 implements a fuel-cut control of the engine 14 to stop an operation of the engine 14, and places the first motor/generator MG1 in a non-load free state, so that the first motor/generator MG1 is freely rotatable and the engine rotating speed ωe is held zero or substantially zero, so as to reduce a pumping loss due to dragging of the engine 14 (resistance to rotary motion of the engine 14). Thus, the deceleration of the vehicle 10 is accordingly reduced whereby the regenerative torque generated by the second motor/generator MG2 is increased. In the control of the overall braking torque in which the generation of the regenerative torque by the second motor/generator MG2 is given the highest priority, the required overall braking torque is obtained by the engine braking torque and/the wheel braking torque, in place of a part or an entirety of the regenerative torque, when the generation of the regenerative torque is limited due to limitation of charging of the battery 52 (due to the maximum charging amount Win).

There will be described a case when it is determined that a shift-down action to establish the first speed AT gear position (for example, shift-down action from the second speed AT gear position to the first speed AT gear position) in the step-variable transmission portion 20 is to be executed. The shift-down action from the second speed AT gear position to the first speed AT gear position is executed by release of the brake B1 as the releasing engagement device and engagement of the brake B2 as the engaging engagement device, and is executed also by release of the brake B1 as the releasing engagement device and engagement of the one-way clutch F1 that is automatically made after the release of the brake B1. Hereinafter, the shift-down action from the second speed AT gear position to the first speed AT gear position, which is executed by the release of the brake B1 and the engagement of the brake B2, will be referred to as "CtoC 2→1 shift-down action", and the shift-down action from the second speed AT gear position to the first speed AT gear position, which is executed by the release of the brake B1 and the engagement of the one-way clutch F1, will be referred to as "OWC 2→1 shift-down action". The AT shift control portion 82 executes the CtoC 2→1 shift-down action, for example, when more importance is given to responsiveness of the shifting action, and executes the OWC 2→1 shift-down action, for example, when more importance is given to reduction of the shifting shock.

When the OWC 2→1 shift-down action is to be executed upon determination that the shift-down action from the second speed AT gear position to the first speed AT gear position is to be executed during decelerating or coasting run of the vehicle 10, if the AT input torque Ti is lower than zero by a certain degree or more, the one-way clutch F1 is not engaged immediately after the brake B1 has been released, thereby possibly causing a behavior reducing the shifting performance, for example, giving so-called "free-running feeling" to the vehicle operator. If the OWC 2→1 shift-down action is switched to the CtoC 2→1 shift-down action so as not to leave the situation in which the one-way clutch F1 is not engaged, the brake B2 could be engaged with a large speed difference of the brake B2 or a large speed difference between an actual value of the AT input speed ωi and a value of the synchronizing rotating speed (=gear ratio γat of the first speed AT gear position of the step-variable transmission portion 20*output speed ωo of the step-variable transmission portion 20), thereby possibly causing a large shock or other behavior reducing the shifting performance.

When a shifting action, which is to be executed in accordance with a shifting command generated in the next time, is the OWC 2→1 shift-down action, i.e., a shifting action with engagement of the one-way clutch F1 for placing the higher priority on reduction of the shift action, the AT shift control portion 82 delays the execution of the shifting action until a point of time at which the AT input torque Ti is expected to become not lower than a predetermined negative value. That is, when determining that the shift-down action (OWC 2→1 shift-down action) to establish the first speed AT gear position is to be executed during decelerating run of the vehicle 10, the AT shift control portion 82 initiates the execution of the OWC 2→1 shift-down action after the AT input torque Ti becomes not smaller than the predetermined negative value. This predetermined negative value is a predetermined minimum value (lower limit value) of the AT input torque Ti that becomes not lower than a certain value at a point of time at which the release of the brake B1 as the releasing engagement device is completed in process of the OWC 2→1 shift-down action, namely, a predetermined minimum value (lower limit value) from which the AT input torque Ti reaches the certain value by the point of time at which the release of the brake B1 is completed. It is noted that the certain value is a value (e.g., a positive value) of the AT input torque Ti that enables the one-way clutch F1 to be automatically engaged.

Specifically, the electronic control device 80 includes a vehicle-state determining means or portion in the form of a vehicle-state determining portion 88, for realizing a control to initiate the execution of the OWC 2→1 shift-down action after the AT input torque Ti becomes not smaller than the predetermined negative value.

The vehicle-state determining portion 88 determines whether the AT input torque Ti is not lower than the predetermined negative value. In other words, the vehicle-state determining portion 88 determines whether the AT input torque Ti is lower than the predetermined negative value, namely, whether an absolute value of the AT input torque Ti is larger than an absolute value of the predetermined negative value.

When controlling the regenerative operation of the second motor/generator MG2, if it is determined by the vehicle-state determining portion 88 that the AT input torque Ti is smaller than the predetermined negative value, the braking-torque control portion 86 implements a regeneration reduction by which at least a part of the regenerative torque generated by the second motor/generator MG2 is switched to the wheel braking torque. For example, the braking-torque control portion 86 implements the regeneration reduction, by gradually reducing the regenerative torque of the second motor/generator MG2 and gradually increasing the wheel braking torque, such that the reduction of the overall braking torque (due to the reduction of the regenerative torque) is compensated by the increase of the wheel braking torque.

The vehicle-state determining portion 88 determines whether the AT input torque Ti is not lower than the predetermined negative value, by using a value of the regenerative torque generated by the second motor/generator MG2 and/or a value of the engine braking torque by the engine 14.

For example, the vehicle-state determining portion 88 determines whether the AT input torque Ti is not lower than the predetermined negative value, by using a value of the regenerative torque of the second motor/generator MG2. Specifically, the vehicle-state determining portion 88 determines whether the AT input torque Ti is lower than the predetermined negative value, based on whether the regenerative torque of the second motor/generator MG2 is lower than a first predetermined value as an example of the predetermined negative value. This first predetermined value is, for example, an amount of torque (=ΔTQbk× TMdrnb1) by which the regenerative torque is switched to (or substituted by) the wheel braking torque, and which is determined based on a rate ΔTQbk of switching between the regenerative torque and the wheel braking torque and a length TMdrnb1 of time from initiation of execution of the OWC 2→1 shift-down action to completion of release of the releasing engagement device (brake B1).

Further, for example, the vehicle-state determining portion 88 determines whether the AT input torque Ti is not lower than the predetermined negative value, by using a value of the engine braking torque of the engine 14. Specifically, the vehicle-state determining portion 88 determines whether the AT input torque Ti is lower than the predetermined negative value, based on whether the engine braking torque of the engine 14 is lower than a second predetermined value as an example of the predetermined negative value. This second predetermined value is, for example, an amount of torque (=ΔTQpt×TMdrnb1) by which the engine braking torque is reduced until the point of time of completion of the release of the releasing engagement device, and which is determined based on a rate ΔTQpt of change of the engine braking torque and the length TMdrnb1 of time from initiation of execution of the OWC 2→1 shift-down action to completion of release of the releasing engagement device (brake B1). Unlike in the switching between the regenerative torque and the wheel brake torque, in the vicinity of zero in the engine braking torque, teeth hitting between rotary members, shock and balance of responsiveness in the vehicular drive system 12 upon switching between the driven state and the driving state are taken into account in determination of the rate ΔTQpt of change of the engine braking torque.

Further, for example, the vehicle-state determining portion 88 determines whether the AT input torque Ti is not lower than the predetermined negative value, by using a value of the regenerative torque of the second motor/generator MG2 and a value of the engine braking torque of the engine 14. Specifically, the vehicle-state determining portion 88 determines whether the AT input torque Ti is lower than the predetermined negative value, based on whether a sum of the regenerative torque of the second motor/generator MG2 and the engine braking torque of the engine 14 is lower than a third predetermined value as an example of the predetermined negative value.

This third predetermined value is, for example, a predetermined minimum value of the sum of the regenerative torque and the engine braking torque, which is determined by considering that the AT input torque Ti is one of factors that cause the free-running feeling and the shifting shock in the OWC 2→1 shift-down action.

When determining that the OWC 2→1 shift-down action is to be executed during decelerating run of the vehicle 10, if it is determined by the vehicle-state determining portion 88 that the AT input torque Ti is lower than the predetermined negative value, the AT shift control portion 82 does not execute the OWC 2→1 shift-down action, namely, delays output of the hydraulic control command signal Sat corresponding to a shift-down command for the execution of the OWC 2→1 shift-down action. On the other hand, when determining that the OWC 2→1 shift-down action is to be executed during decelerating run of the vehicle 10, if it is determined by the vehicle-state determining portion 88 that the AT input torque Ti is not lower than the predetermined negative value, the AT shift control portion 82 outputs the hydraulic control command signal Sat corresponding to the above-described shift-down command or cancels the delay of outputting the hydraulic control command signal Sat corresponding to the above-described shift-down command. That is, when determining that the OWC 2→1 shift-down action is to be executed during decelerating run of the vehicle 10, if it is determined by the vehicle-state determining portion 88 that the AT input torque Ti is not lower than the predetermined negative value, the AT shift control portion 82 initiates the execution of the OWC 2→1 shift-down action, namely, initiates outputs of the hydraulic control command signal Sat corresponding to the above-described shift-down command.

The vehicle-state determining portion 88 determines whether the shift-down action to establish the first speed AT gear position is requested by operation made by the vehicle operator. For example, the vehicle-state determining portion 88 determines whether a manual shift down to the first speed AT gear position is requested by the operator's shifting operation. Further, the vehicle-state determining portion 88 determines whether the braking operation made by the operator is a large depressing force applied to the brake pedal (that causes the master-cylinder hydraulic pressure Pmc to be increased largely), which requests a quick shift-down action to establish the first speed AT gear position. The vehicle-state determining portion 88 determines that the shift-down action to establish the first speed AT gear position is not requested by operation made by the vehicle operator, when determining that there is no operator's shifting operation (no manual operation) without a large depressing force being applied to the brake pedal (namely, the required deceleration G is smaller than a predetermined value).

When determining that the OWC 2→1 shift-down action is to be executed during decelerating run of the vehicle 10, if it determined by the vehicle-state determining portion 88 that the shift-down action to establish the first speed AT gear position is requested by operation made by the vehicle operator, the AT shift control portion 82 initiates execution of the CtoC 2→1 shift-down action in place of execution of the OWC 2→1 shift-down action, namely, initiates output of the hydraulic control command signal Sat corresponding to the shift-down command for the execution of the CtoC 2→1 shift-down action.

The vehicle-state determining portion 88 determines whether the vehicle operator has an intention to accelerate the vehicle 10. The vehicle-state determining portion 88 determines whether the vehicle operator has the intention of the acceleration, based on whether the acceleration operation is made by the operator to cause the AT input torque Ti to be a positive value (for example, whether the acceleration operation is made by the vehicle by such a degree that makes a prediction of change of the AT input torque Ti to a positive value). Alternatively, the determination as to whether the vehicle operator has the intention of the acceleration may be made based on whether the accelerator pedal is kept depressed by at least a certain value (for example, 20 to 30%) as the accelerator-pedal operation degree θacc, for at least a predetermined length of time, wherein the certain value is a value of the accelerator-pedal operation degree θacc that makes it possible to affirm the operator's clear intention of accelerating the vehicle 10, or based on whether an integrated value of the accelerator-pedal operation degree θacc is at least a predetermined value.

When determining that the OWC 2→1 shift-down action is to be executed during decelerating run of the vehicle 10, if it determined by the vehicle-state determining portion 88 that the acceleration operation is made by the operator to cause the AT input torque Ti to be a positive value, the AT shift control portion 82 initiates execution of the OWC 2→1 shift-down action, irrespective of whether the AT input torque Ti has become at least the predetermined negative value.

The vehicle-state determining portion 88 determines whether the vehicle running speed V is lower than a predetermined fourth value. This predetermined fourth value is a predetermined maximum value (upper limit value) of the running speed V that makes it possible to determine that the running speed V is reduced toward the above-described predetermined low value at which the creep torque is generated for causing the AT input torque Ti to be a positive value at a point of time at which the release of the releasing engagement device (brake B1) is completed in process of the OWC 2→1 shift-down action.

When determining that the OWC 2→1 shift-down action is to be executed during decelerating run of the vehicle 10, if it determined by the vehicle-state determining portion 88 that the vehicle running speed V is lower than a predetermined fourth value, namely, that the running speed V is reduced toward the above-described predetermined low value at which the creep torque is generated for causing the AT input torque Ti to be a positive value at a point of time at which the release of the releasing engagement device is completed in process of the OWC 2→1 shift-down action, the AT shift control portion 82 initiates execution of the OWC 2→1 shift-down action, irrespective of whether the AT input torque Ti has become at least the predetermined negative value.

Figure 7:
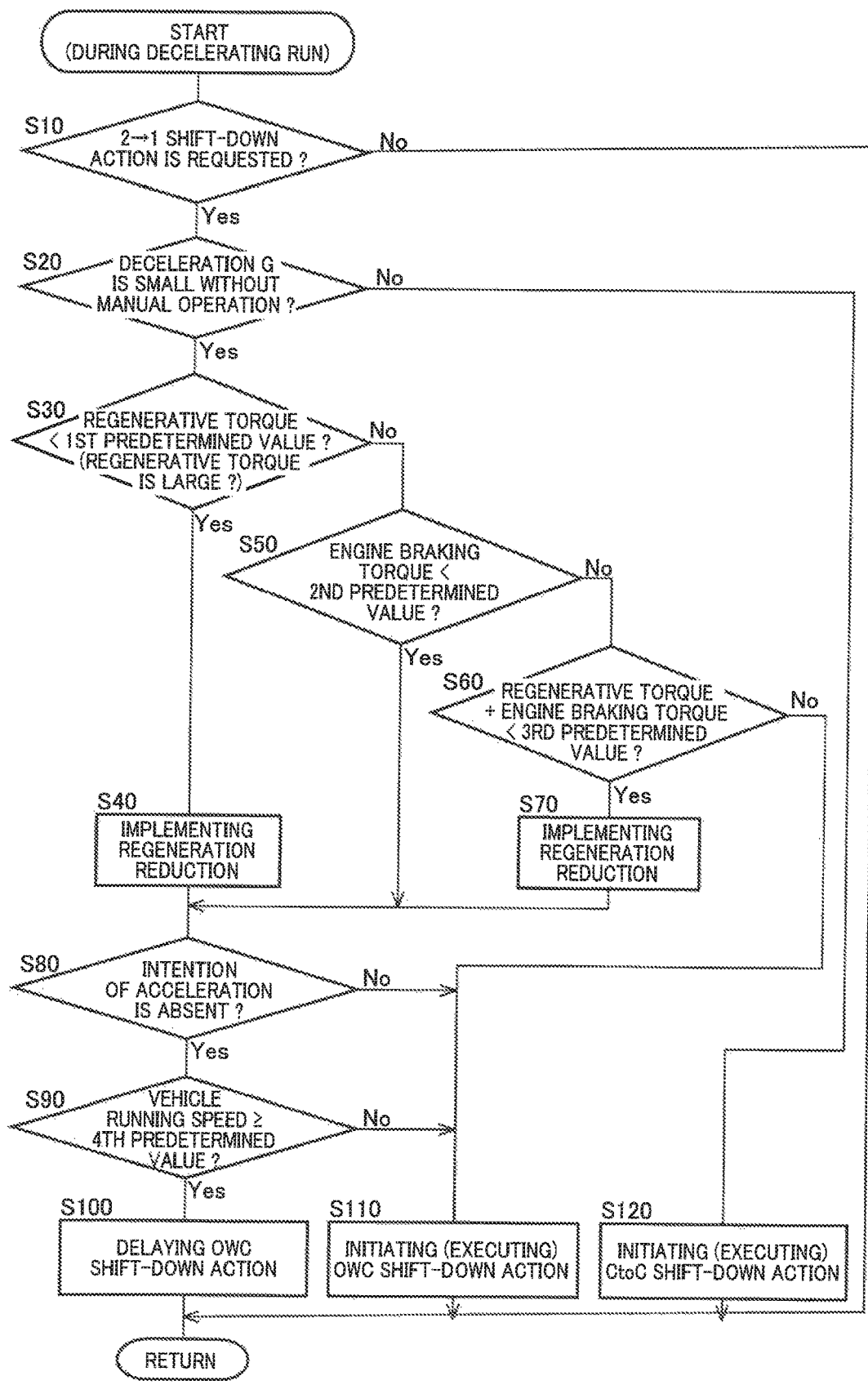
FIG. 7 is a flow chart illustrating an essential part of a main control routine executed by an electronic control device, namely, a control routine that is executed, when it is determined that a shift-down action to establish a certain gear position by engagement of a one-way clutch is to be executed during deceleration run of the vehicle, to restrain behavior reducing the shifting performance.
Figure 8:
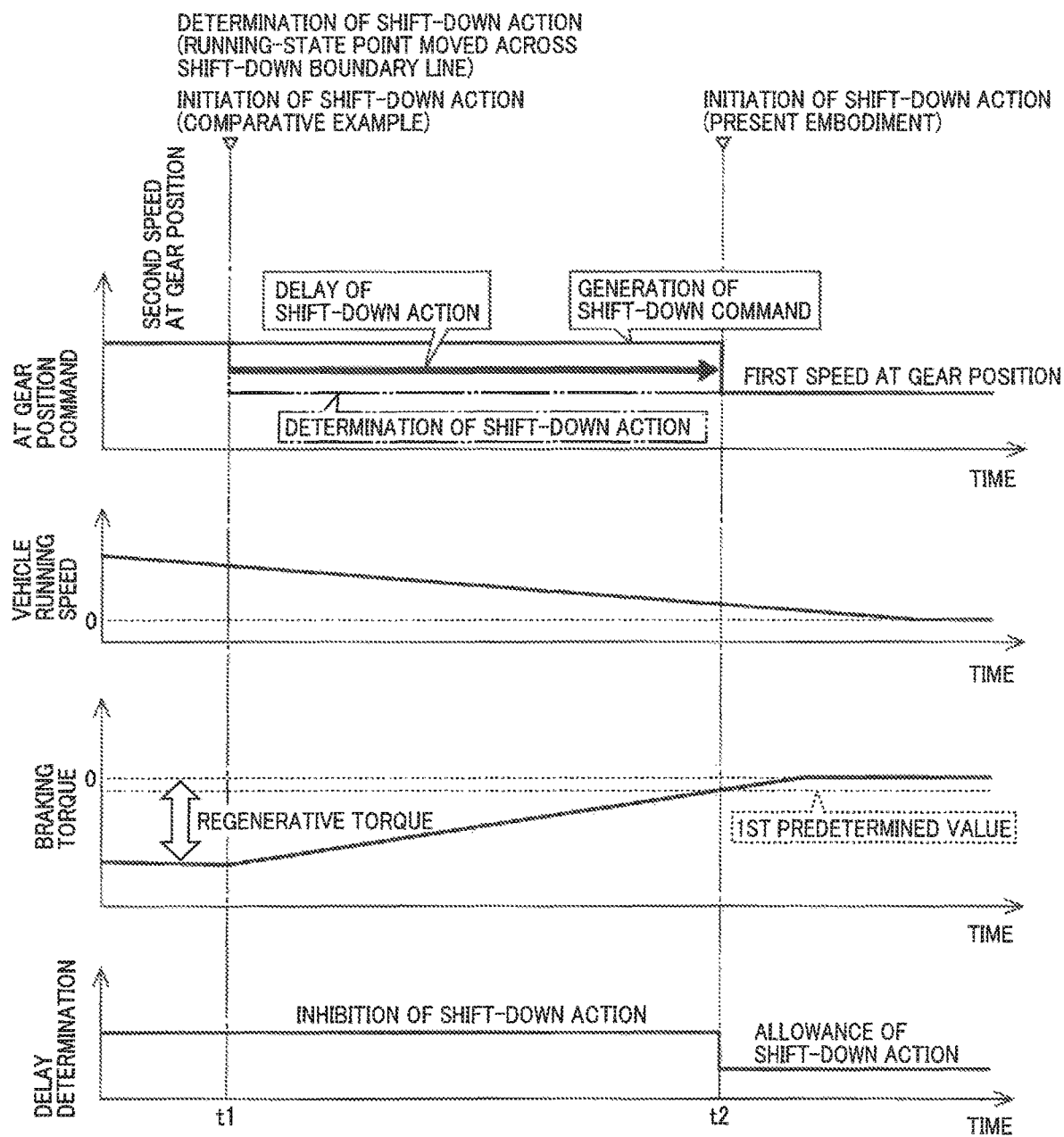
FIG. 8 is a time chart illustrating a case, by way example, where the control routine shown by the flow chart of FIG. 7 is executed, particularly, when it is determined that a shift-down action from a second speed AT gear position to a first speed AT gear position is to be executed in the step-variable transmission portion while a regenerative torque is generated during decelerating run of the vehicle.
Figure 9:
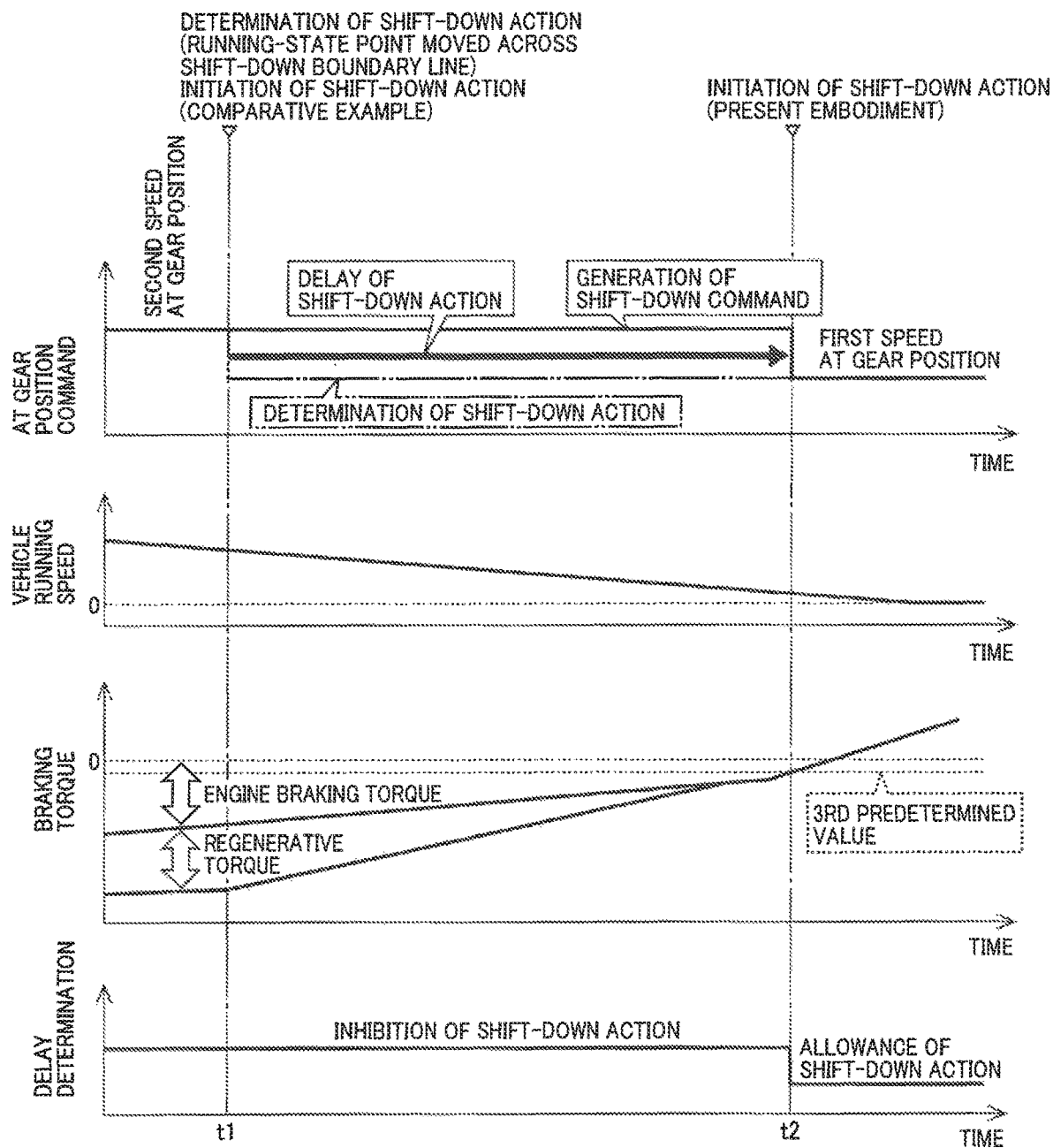
FIG. 9 is a time chart illustrating a case, by way example, where the control routine shown by the flow chart of FIG. 7 is executed, particularly, when it is determined that the shift-down action from the second speed AT gear position to the first speed AT gear position is to be executed in the step-variable transmission portion while a regenerative torque and an engine braking torque are both generated during decelerating run of the vehicle.

FIG. 7 is a flow chart illustrating an essential part of a main control routine executed by the electronic control device 80, namely, a control routine that is executed, when it is determined that the shift-down action (particularly, the OWC 2→1 shift-down action) to establish the first speed AT gear position is to be executed during deceleration run of the vehicle 10, to restrain behavior reducing the shifting performance. This control routine is repeatedly executed during the decelerating run of the vehicle 10. FIGS. 8 and 9 are time charts showing examples of the control routine illustrated in the flow chart of FIG. 7.

The control routine of FIG. 7 is initiated with step S10 corresponding to function of the AT shift control portion 82, to determine whether the shift-down action (particularly, the OWC 2→1 shift-down action) to establish the first speed AT gear position from the second speed AT gear position is to be executed, namely, whether a command requesting the shift-down action from the second speed AT gear position to the first speed AT gear position is outputted. If a negative determination is made at step S10, one cycle of execution of the control routine is terminated. If an affirmative determination is made at step S10, step S20 corresponding to function of the vehicle-state determining portion 88 is implemented to determine whether the deceleration G of the vehicle 10 is small without the operator's shifting operation (manual operation). If an affirmative determination is made at step S20, step S30 corresponding to function of the vehicle-state determining portion 88 is implemented to determine whether the regenerative torque is lower than the first predetermined value, namely, whether an absolute value of the regenerative torque is larger than an absolute value of the first predetermined value. If an affirmative determination is made at step S30, step S40 corresponding to function of the braking-torque control portion 86 is implemented to implement the regeneration reduction. If a negative determination is made at step S30, the control flow goes to step S50 corresponding to function of the vehicle-state determining portion 88, which is implemented to determine whether the engine braking torque of the engine 14 is lower than the second predetermined torque. If a negative determination is made at step S50, the control flow goes to step S60 corresponding to function of the vehicle-state determining portion 88, which is implemented to determine whether a sum of the regenerative torque of the second motor/generator MG2 and the engine braking torque of the engine 14 is lower than the third predetermined torque. If an affirmative determination is made at step S60, step S70 corresponding to function of the braking-torque control portion 86 is implemented to implement the regeneration reduction if the regenerative operation of the second motor/generator MG2 is performed. After implementation of step S40 or step S70, or if an affirmative determination is made at step S50, the control flow goes to step 80 corresponding to function of the vehicle-state determining portion 88, which is implemented to determine whether operator's intention to accelerate the vehicle 10 is absent. If an affirmative determination is made at step S80, namely, if it is determined at step S80 that there is no operator's intention to accelerate the vehicle 10, step S90 corresponding to function of the vehicle-state determining portion 88 is implemented to determine whether the vehicle running speed V is at least the fourth predetermined value. If an affirmative determination is made at step S90, step S100 corresponding to function of the AT shift control portion 82 is implemented to delay output of the hydraulic control command signal Sat corresponding to the shift-down command for the execution of the OWC 2→1 shift-down action. If a negative determination is made at step S60, at step S80 or at step S90, the control flow goes to step S110 corresponding to function of the AT shift control portion 82, which is implemented to initiate output of the hydraulic control command signal Sat corresponding to the shift-down command for the execution of the OWC 2→1 shift-down action. If a negative determination is made at step S20, the control flow goes to step S120 corresponding to function of the AT shift control portion 82, which is implemented to initiate output of the hydraulic control command signal Sat corresponding to the shift-down command for the execution of the CtoC 2→1 shift-down action in place of the execution of the OWC 2→1 shift-down action.

FIG. 8 shows, by way of example, a case where it is determined that the OWC 2→1 shift-down action is to be executed in the step-variable transmission portion 20 while the regenerative torque is generated during decelerating run of the vehicle 10. In FIG. 8, a point t1 of time indicates a point of time at which it is determined that the OWC 2→1 shift-down action is to be executed during the decelerating run. In a comparative example, at this point t1 of time, output of the hydraulic control command signal Sat for the execution of the OWC 2→1 shift-down action is initiated. On the other hand, in the present embodiment, the execution of the OWC 2→1 shift-down action is inhibited and the output of the hydraulic control command signal Sat for the execution of the OWC 2→1 shift-down action is delayed, as long as the regenerative torque is lower than the first predetermined value. After the regenerative torque has become the first predetermined value or higher, the execution of the OWC 2→1 shift-down action is allowed and the output of the hydraulic control command signal Sat for the execution of the OWC 2→1 shift-down action is initiated (see point t2 of time).

FIG. 9 shows, by way of example, a case where it is determined that the OWC 2→1 shift-down action is to be executed in the step-variable transmission portion 20 while the regenerative torque and the engine braking torque are generated during decelerating run of the vehicle 10. In FIG. 9, a point t1 of time indicates a point of time at which it is determined that the OWC 2→1 shift-down action is to be executed during the decelerating run. In a comparative example, at this point t1 of time, output of the hydraulic control command signal Sat for the execution of the OWC 2→1 shift-down action is initiated. On the other hand, in the present embodiment, the execution of the OWC 2→1 shift-down action is inhibited and the output of the hydraulic control command signal Sat for the execution of the OWC 2→1 shift-down action is delayed, as long as the sum of the regenerative torque and the engine braking torque is lower than the third predetermined value. After the sum of the regenerative torque and the engine braking torque has become the third predetermined value or higher, the execution of the OWC 2→1 shift-down action is allowed and the output of the hydraulic control command signal Sat for the execution of the OWC 2→1 shift-down action is initiated (see point t2 of time).

In the present embodiment, the transmission shifting control portion 82 as the shift control portion is configured, when determining that the shift-down action to establish the first speed AT gear position by the engagement of the one-way clutch F1 is to be executed during the decelerating run of the vehicle 10, to initiate execution of the shift-down action (OWC 2→1) to establish the first speed AT gear position by the release of the brake B1 as the releasing engagement device and the engagement of the one-way clutch F1 (that is made automatically after the release of the brake B1) after the AT input torque Ti becomes not lower than the predetermined negative value. The predetermined negative value is a predetermined minimum value that becomes not lower than a certain value at a point of time at which the release of the brake B1 is completed in process of the shift-down action, namely, a predetermined minimum value from which the AT input torque Ti can reach a certain value or higher as the point of time at which the release of the brake B1 is completed in process of the shift-down action, wherein the certain value is a value of the AT input torque Ti enabling the one-way clutch F1 to be automatically engaged. This arrangement makes it possible to cause the one-way clutch F1 to be engaged easily after the brake B1 has been released, so that the vehicle operator is less likely to uncomfortably recognize a free-running feeling due to failure of the engagement of the one-way clutch F1 after the release of the brake B1. Therefore, when it is determined that the shift-down action to establish the the first speed AT gear position from the second speed AT gear position, is to be executed during decelerating run of the vehicle 10, it is possible to restrain a behavior undesirably reducing the shifting performance.

In the present embodiment, the transmission shifting control portion 82 as the shift control portion is configured to initiate the execution of the shift-down action (CtoC 2→1 shift-down action) to establish the first speed AT gear position by the release of the releasing engagement device (brake B1) and the engagement of the other engagement device (brake B2) that is disposed in parallel with the one-way clutch F1, when the shift-down action to establish the first speed AT gear position is requested by an operation made by the vehicle operator. Therefore, the shift-down action requested by the operator is executed in quick response to the operation made by the operator, without delaying the execution of the shift-down action until the AT input torque Ti becomes not lower than the predetermined negative value. Further, when the execution of the CtoC 2→1 shift-down action is initiated, the brake B1 as the releasing engagement device is not yet released because of delay of the execution of the OWC 2→1 shift-down action, so that it is possible to restrain shock generated by the engagement of the brake B2 as the other engagement device.

In the present embodiment, the transmission shifting control portion 82 as the shift control portion is configured to initiate the execution of the OWC 2→1 shift-down action, when an acceleration operation is made by the vehicle operator so as to increase the AT input torque Ti to a positive value. Therefore, it is not necessary to delay the execution of the shift-down action until the AT input torque Ti becomes not lower than the predetermined negative value.

In the present embodiment, the transmission shifting control portion 82 as the shift control portion is configured to initiate the execution of the OWC 2→1 shift-down action, when the running speed V is reduced toward the predetermined low value (at which the creep torque is generated) such that the AT input torque Ti is increased to a positive value by the creep torque at a point of time at which the release of the brake B1 is completed in process of the OWC 2→1 shift-down action. Therefore, it is not necessary to delay the execution of the shift-down action until the AT input torque Ti becomes not lower than the predetermined negative value.

In the present embodiment, the vehicle-state determining portion 88 makes a determination as to whether the AT input torque Ti is not lower than the predetermined negative value, such that the determination is made based on the regenerative torque generated by the second motor/generator MG2 and/or the engine braking torque generated by the engine 14. Therefore, it is appropriately determined whether the AT input torque Ti is not lower than the predetermined negative value.

In the present embodiment, the braking-torque control portion 86 is configured, when it is determined that the AT input torque Ti is lower than the predetermined negative value, to switch at least a part of the regenerative torque to the wheel braking torque. Therefore, it is possible to reduce a length of time for which the execution of the shift-down action is delayed until the AT input torque Ti becomes not lower than the predetermined negative value.

There will be described another embodiment of this invention. The same reference signs as used in the above-described embodiment will be used in the following embodiment, to identify the functionally corresponding elements, and descriptions thereof are not provided.

Second Embodiment

Figure 10:
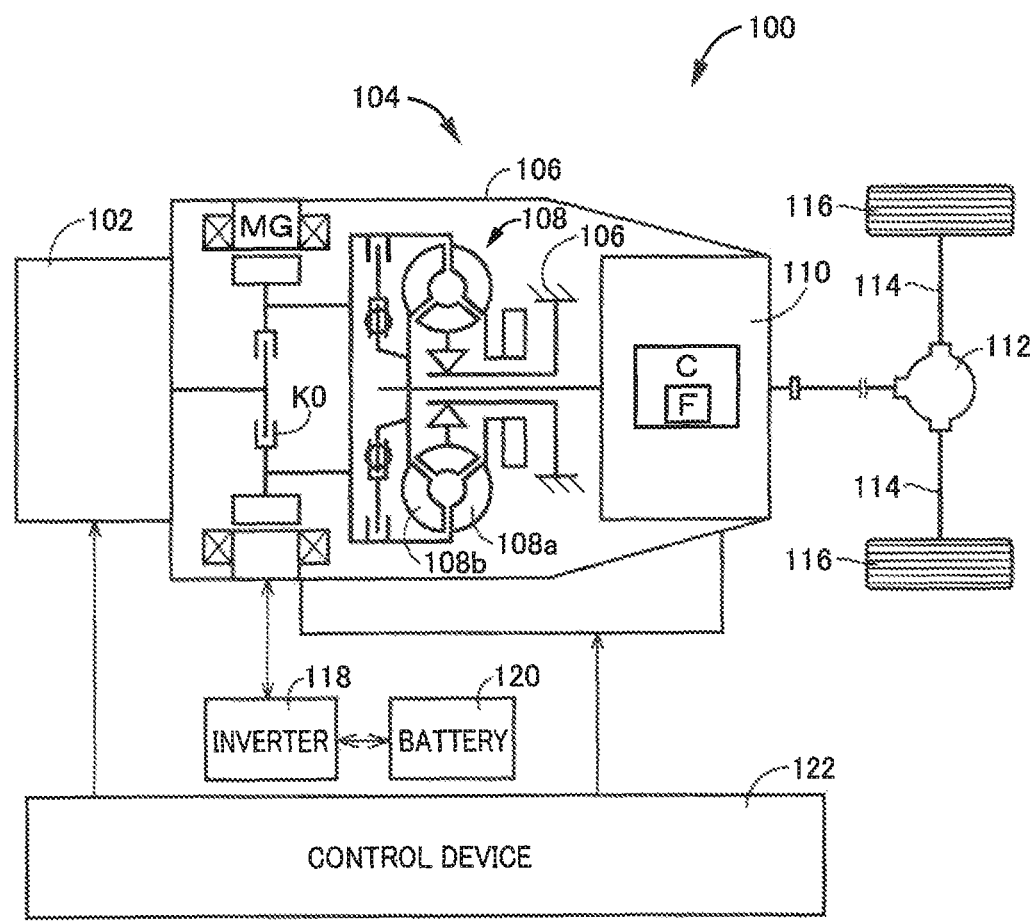
FIG. 10 is a schematic view showing an arrangement of a power transmitting system of a vehicle (that is different from the vehicle shown in FIG. 1) to be controlled by a control apparatus according to the present invention.

In this second embodiment, the control apparatus according to the invention is used for controlling a vehicle 100 shown in FIG. 10, which is different from the vehicle 10 in the first embodiment in which the continuously variable transmission portion 18 and the step-variable transmission portion 20 are connected in series with each other.

As shown in FIG. 10, the vehicle 100 is a hybrid vehicle including an engine 102 serving as a drive power source, a motor/generator (rotating machine) MG also serving as the drive power source, and a power transmitting system 104.

The power transmitting system 104 includes a clutch K, a torque converter 108, and an automatic transmission 110, which are disposed within a non-rotatable member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108*a* selectively connected to the engine 102 through the clutch K0 and directly connected to the motor/generator MG and a turbine impeller 108*b* directly connected to the automatic transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the differential gear device 112 and the axles 114, in this order of description. The automatic transmission 110 is a mechanically-operated transmission mechanism which constitutes a part of a power transmitting path between the drive power source (that is constituted by the engine 102 and the motor/generator MG) and the drive wheels 116, and is a known automatic transmission of a planetary gear type which is configured to establish a selected one of a plurality of gear positions by engagement of at least one of a plurality of engagement devices C that includes a one-way clutch (e.g., sprag clutch) F, as the step-variable transmission portion 20 in the above-described first embodiment. The vehicle 100 further includes an inverter 118, and an electric power storage device in the form of a battery 120 to and from which an electric power is respectively supplied from and to the motor/generator MG through the inverter 118, as well as a control device 122.

The control device 122 is configured to selectively establish a motor drive mode in which the vehicle 100 is driven with only the motor/generator MG operated as the drive power source with electric power supplied from the battery 120 while the engine 102 is held at rest, in the released state of the clutch K0, or a hybrid drive mode in which the vehicle 100 is driven with the engine 102 operated as the drive power source, in the engaged state of the clutch K0. In the hybrid drive mode established by the control device 122, a drive torque generated by the motor/generator MG with the electric power supplied from the battery 120 may be added to the drive force generated by the engine 102, or the motor/generator MG may be operated as an electric generator with the drive force of the engine 102, so that the battery 120 is charged with the electric power generated by the motor/generator MG Thus, the motor/generator MG has a function of an electric motor and a function of an electric generator. An output torque (vehicle driving torque or regenerative torque) of the motor/generator MG is controlled by the inverter 118 under the control of the electric device 122.

The control device 122 has the functions of the transmission shifting control portion 82, hybrid control portion 84, braking-torque control portion 86 and vehicle-state determining portion 88, which are incorporated in the electronic control device 80 according to the above-described first embodiment. Like the electronic control device 80, the control device 122 is capable of performing various controls for initiating execution of the OWC 2→1 shift-down action after the AT input torque Ti becomes not lower than the predetermined negative value.

The present second embodiment has the same advantages as the first embodiment described above.

While the preferred embodiments of this invention have been described in detail by reference to the drawings, it is to be understood that the invention may be otherwise embodied.

For example, in the above-described first embodiment, the first speed AT gear position of the step-variable transmission portion 20 corresponds to one of the plurality of gear positions which is established by engagement of a one-way clutch. However, the one of the plurality of gear positions which is established by engagement of a one-way clutch may be any one of a plurality of gear positions established in a mechanically-operated transmission mechanism, as long as it is a gear position to be established by engagement of a one-way clutch.

In the above-described embodiments, the brake pedal is used as an example of the brake operation member. However, the brake operation member may be a vehicle deceleration setting device operable by the vehicle operator to set a target value of the deceleration during decelerating run of the vehicle 10.

In the above-described first embodiment, the vehicle 10 is provided with the differential mechanism 32 in the form of a planetary gear set of a single-pinion type, and the continuously-variable transmission portion 18 serving as an electrically-controlled transmission mechanism. However, the continuously-variable transmission portion 18 may be a transmission mechanism the differential state of which is limited by controlling a clutch or brake connected to one of the rotary elements of the differential mechanism 32. Further, the differential mechanism 32 may be a planetary gear set of a double-pinion type, or may be replaced by a differential mechanism which includes a plurality of planetary gear sets having four or more rotary elements. Further, the differential mechanism 32 may be replaced by a differential gear device including a pinion rotated by the engine 14, and a pair of bevel gears which mesh with the pinion and to which the first motor/generator MG1 and the intermediate power-transmitting member 30 are respectively connected. Further, the differential mechanism 32 may be replaced by a mechanism which includes two or more planetary gear sets rotary elements of which are connected to each other and/or operatively connected to the engine, motor/generator and drive wheels, in power transmittable manner.

The vehicle 100 in the above-described second embodiment may not be provided with the engine 102, the clutch K0 and the torque converter 108, such that the motor/generator MG is connected directly to an input rotary member of the automatic transmission 110. In this case, the determination as to whether the input torque inputted to the mechanically-operated transmission mechanism is not lower than the predetermined negative value is made based on a regenerative torque generated by the motor/generator MG. Further, the vehicle 100 may not be provided with the motor/generator MG and the clutch K0, such that the engine 102 is connected to an input rotary member of the automatic transmission 110. In this case, the determination as to whether the input torque inputted to the mechanically-operated transmission mechanism is not lower than the predetermined negative value is made based on an engine brake torque generated by the engine 102. Namely, the control apparatus according to the present invention is applicable to any vehicle as long as the vehicle includes (i) a drive power source and (ii) a mechanically-operated transmission mechanism which constitutes a part of a power transmitting path between the drive power source and drive wheels of the vehicle and which is configured to establish each of a plurality of gear positions by engagement of at least one of a plurality of engagement devices including a one-way clutch. While the vehicle 100 uses the torque converter 108 as a fluid-operated power transmitting device, the vehicle 100 may use other types of fluid-operated power transmitting devices such as a fluid coupling, which do not have a torque boosting function.

In the above-described first embodiment, the ten overall speed positions are established for the four AT gear appositions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power-transmitting member 30 and the operating speed of the second motor/generator MG2 connected to the intermediate power-transmitting member 30 are held within respective predetermined ranges, and the transmission device 40 is shifted such that the engine speed ωe is held within a predetermined range.

In the above-described first embodiment, with the shift lever 56 being placed in the manual position M as one of the operation positions POSsh, the transmission device 40 is placed in its manual shift position whereby one of the overall speed positions can be switched to another by shifting operation made to the shift lever 56 by the vehicle operator. However, the manual shift position, in which the transmission device 40 is placed when the shift lever 56 is placed in the manual position M, may be a position that allows one of a plurality of various gear ranges (shift ranges) to be switched to another by the manual shifting operation, wherein the lowest-speed gear position and the highest-speed gear position are defined in each of the various gear ranges such that the various gear ranges are different from one another in the highest-speed gear position. Further, the manual shifting mode does not necessarily have to be available in the vehicle 10. Where the manual shifting mode is not available in the vehicle 10, the execution of the CtoC 2→1 shift-down action in place of the OWC 2→1 shift-down action in the case of request of the shift-down action to the first speed AT gear position by the operator's shifting operation, is not carried out.

It is to be understood that the embodiments described above are given for illustrative purpose only, and that the present invention may be embodied with various modifications and improvements which may occur to those skilled in the art.

NOMENCLATURE OF ELEMENTS

10: vehicle
14: engine (drive power source)
18: electrically-controlled continuously-variable transmission portion (electrically-controlled transmission mechanism)
20: mechanically-operated step-variable transmission portion (mechanically-operated transmission mechanism)
28: drive wheels
30: intermediate power-transmitting member (output rotary member of electrically-controlled transmission mechanism)
32: differential mechanism
55: wheel braking device (braking device)
80: electronic control device (control apparatus)
82: AT shift control portion (shift control portion)
86: braking-torque control portion
88: vehicle-state determining portion
B1: brake (releasing engagement device)
B2: brake (another engagement device)
E: engagement device
F1: one-way clutch
MG1: first motor/generator
MG2: second motor/generator (drive power source, motor/generator)
100: vehicle
102: engine (drive power source)
110: automatic transmission (mechanically-operated transmission mechanism)
116: drive wheels
122: control device
C: engagement device
F: one-way clutch
MG: motor/generator (drive power source)

What is claimed is:

1. A control apparatus for a vehicle that includes (i) a drive power source and (ii) a mechanically-operated transmission mechanism which constitutes a part of a power transmitting path between the drive power source and drive wheels of the vehicle and which is configured to establish each of a plurality of gear positions by engagement of at least one of a plurality of engagement devices including a one-way clutch, said control apparatus comprising:
a shift control portion configured to determine whether a shift-down action to establish one of the plurality of gear positions by release of one of the plurality of engagement devices and engagement of the one-way clutch that is made after the release of the one of the plurality of engagement devices, is to be executed during decelerating run of the vehicle, wherein
said shift control portion is configured, when determining that said shift-down action to establish said one of the plurality of gear positions is to be executed during the decelerating run of the vehicle, to initiate execution of said shift-down action to establish said one of the plurality of gear positions after an input torque inputted to the mechanically-operated transmission mechanism becomes not lower than a predetermined negative value, and
the predetermined negative value is a predetermined minimum value that becomes not lower than a certain value at a point of time at which the release of said one of the plurality of engagement devices is completed in process of said shift-down action, said certain value being a value of the input torque enabling the one-way clutch to be automatically engaged.

2. The control apparatus according to claim 1, wherein
said one of the plurality of gear positions is established by the release of said one of the plurality of engagement devices and either one of the engagement of the one-way clutch and engagement of another one of the plurality of engagement devices, said another one being provided in parallel with the one-way clutch, and
said shift control portion is configured to initiate the execution of said shift-down action to establish said one of the plurality of gear positions by the release of said one of the plurality of engagement devices and the engagement of said another one of the plurality of engagement devices, when the shift-down action to establish said one of the plurality of gear positions is requested by an operation made by an operator of the vehicle.

3. The control apparatus according to claim 1, wherein
said shift control portion is configured to initiate the execution of said shift-down action to establish said one of the plurality of gear positions by the release of said one of the plurality of engagement devices and the engagement of the one-way clutch, when an acceleration operation is made by an operator of the vehicle so as to increase the input torque to a positive value.

4. The control apparatus according to claim 1, wherein
the drive power source of the vehicle is configured to generate a creep torque causing the vehicle to be moved slowly, when a running speed of the vehicle is not higher than a predetermined low value without an acceleration operation, and
said shift control portion is configured to initiate the execution of said shift-down action to establish said one of the plurality of gear positions by the release of said one of the plurality of engagement devices and the engagement of the one-way clutch, when the running speed is reduced toward said predetermined low value such that the input torque inputted to the mechanically-operated transmission mechanism is increased to a positive value by the creep torque at a point of time at which the release of said one of the plurality of engagement devices is completed in process of said shift-down action.

5. The control apparatus according to claim 1, wherein
the vehicle includes a motor/generator that serves as the drive power source, and
said control apparatus further comprises a vehicle-state determining portion configured to make a determination as to whether the input torque inputted to the mechanically-operated transmission mechanism is not lower than said predetermined negative value, such that the determination is made based on a regenerative torque generated by the motor/generator.

6. The control apparatus according to claim 5, wherein
the vehicle includes a braking device configured to apply a wheel braking torque to the drive wheels, and
said control apparatus further comprises a braking-torque control portion that is configured, when it is determined that the input torque inputted to the mechanically-operated transmission mechanism is lower than said predetermined negative value, to switch at least a part of the regenerative torque to the wheel braking torque.

7. The control apparatus according to claim 1, wherein
the vehicle includes an engine that serves as the drive power source, and
said control apparatus further comprises a vehicle-state determining portion configured to make a determination as to whether the input torque inputted to the mechanically-operated transmission mechanism is not lower than said predetermined negative value, such that the determination is made based on an engine braking torque generated by the engine.

8. The control apparatus according to claim 1, wherein
the vehicle includes a motor/generator and an engine, both of which serve as the drive power source, and
said control apparatus further comprises a vehicle-state determining portion configured to make a determination as to whether the input torque inputted to the mechanically-operated transmission mechanism is not lower than said predetermined negative value, such that the determination is made based on a regenerative torque generated by the motor/generator and/or an engine braking torque generated by the engine.

9. The control apparatus according to claim 1, wherein
the vehicle includes:
an engine that serves as the drive power source;
an electrically-controlled transmission mechanism including a differential mechanism to which the engine is connected in a power transmittable manner, and a first motor generator connected to the differential mechanism, such that a differential state of the differential mechanism is controlled with an operating state of the first motor/generator being controlled; and
a second motor/generator which serves as the drive power source and which is connected to an output rotary member of the electrically-controlled transmission mechanism in a power transmittable manner.

10. The control apparatus according to claim 9, further comprising a vehicle-state determining portion configured to make a determination as to whether the input torque inputted to the mechanically-operated transmission mechanism is not lower than said predetermined negative value, such that the determination is made based on a regenerative torque generated by the second motor/generator.

11. The control apparatus according to claim 1, wherein
the plurality of engagement devices include coupling devices each of which is other than the one-way clutch and each of which is to controlled by a control unit so as to be selectively placed in engaged, slipped or released state thereof, and
said one of the plurality of engagement devices, which is to be placed in the released state when said one of the plurality of gear positions is to be established, is one of the coupling devices.

* * * * *